(12) United States Patent
Hasegawa

(10) Patent No.: US 7,440,665 B2
(45) Date of Patent: Oct. 21, 2008

(54) OPTICAL FIBER

(75) Inventor: Takemi Hasegawa, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 17 days.

(21) Appl. No.: 11/317,016

(22) Filed: Dec. 27, 2005

(65) Prior Publication Data

US 2006/0171648 A1   Aug. 3, 2006

(30) Foreign Application Priority Data

Dec. 27, 2004 (JP) .............................. 2004-377800

(51) Int. Cl.
*G02B 6/036* (2006.01)
(52) U.S. Cl. .................. 385/127; 385/26; 385/123; 385/124; 385/126; 385/128
(58) Field of Classification Search ........... 385/123, 385/124, 126, 127, 128
See application file for complete search history.

(56) References Cited

U.S. PATENT DOCUMENTS

| | | | |
|---|---|---|---|
| 5,170,457 A * | 12/1992 | Jen | 385/123 |
| 6,542,683 B1 * | 4/2003 | Evans et al. | 385/127 |
| 6,587,623 B1 | 7/2003 | Papen et al. | |
| 6,687,440 B2 | 2/2004 | Balestra et al. | |
| 2004/0218882 A1 | 11/2004 | Bickham et al. | |
| 2005/0013569 A1 * | 1/2005 | Dragic | 385/123 |

OTHER PUBLICATIONS

Y. Koyamada, et al., "Simulating and Designing Brillouin Gain Spectrum in Single-Mode Fibers," Journal of Lightwave Technology, Feb. 2004, pp. 631-639, vol. 22, No. 2, IEEE.
Govind P. Agrawal, "Nonlinear Fiber Optics," 1989, pp. 263-269, Section 9.1, Academic Press, Inc.
Anders Hook and Aldo Bolle, "Transient Dynamics of Stimulated Brillouin Scattering in Optical Communication Systems," Journal of Lightwave Technology, Apr. 1992, pp. 493-502, vol. 10, No. 4, IEEE.
Yu et al., "Analysis of Brillouin Frequency Shift and Longitudinal Acoustic Wave in a Silica Optical Fiber With a Triple-Layered Structure", Journal of Lightwave Technology, IEEE Service Center, New York, NY, vol. 21, No. 8, Aug. 2003, pp. 1779-1788, XP002356959.
Ogai et al., "Development and Performanc of Fully Fluorine-Doped Single-Mode Fibers", Journal of Lightwave Technology, IEEE Service Center, New York, NY, vol. 6, No. 10, Oct. 1, 1988, pp. 1455-1461, XP000034866.

* cited by examiner

*Primary Examiner*—Brian Healy
*Assistant Examiner*—Hung Lam
(74) *Attorney, Agent, or Firm*—McDermott Will Emery LLP

(57) ABSTRACT

An optical fiber not only can suppress SBS but also can be produced easily. The optical fiber 1 comprises an optical core region 10 including the center axis and an optical cladding region 14 surrounding the optical core region 10. The optical core region 10 is composed of a first region 11, a second region 12, and a third region 13 in this order from the inside. The third region 13, which is a part of the optical core region 10, is a ring-shaped acoustic core region. The propagation mode of an acoustic wave can be localized in the third region 13.

5 Claims, 16 Drawing Sheets

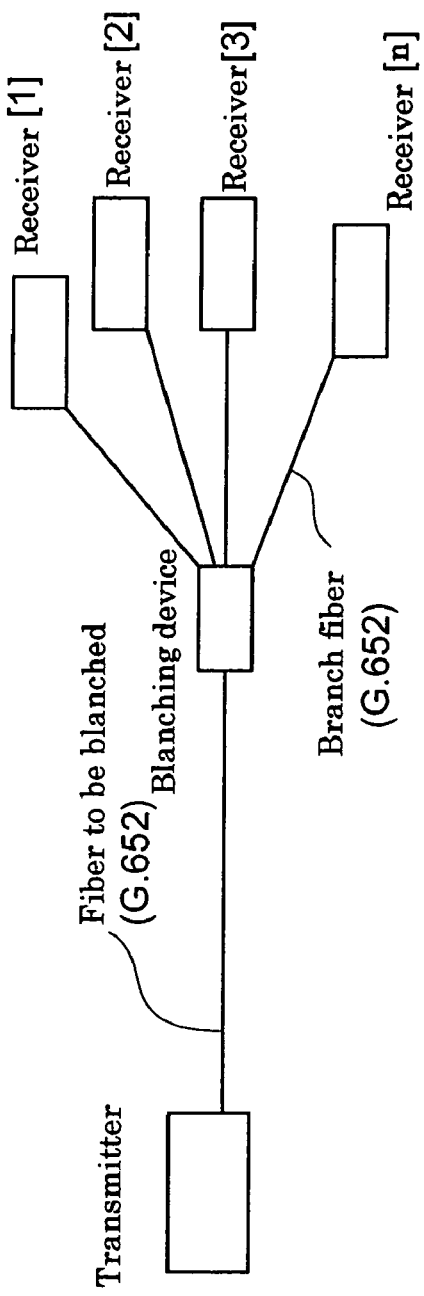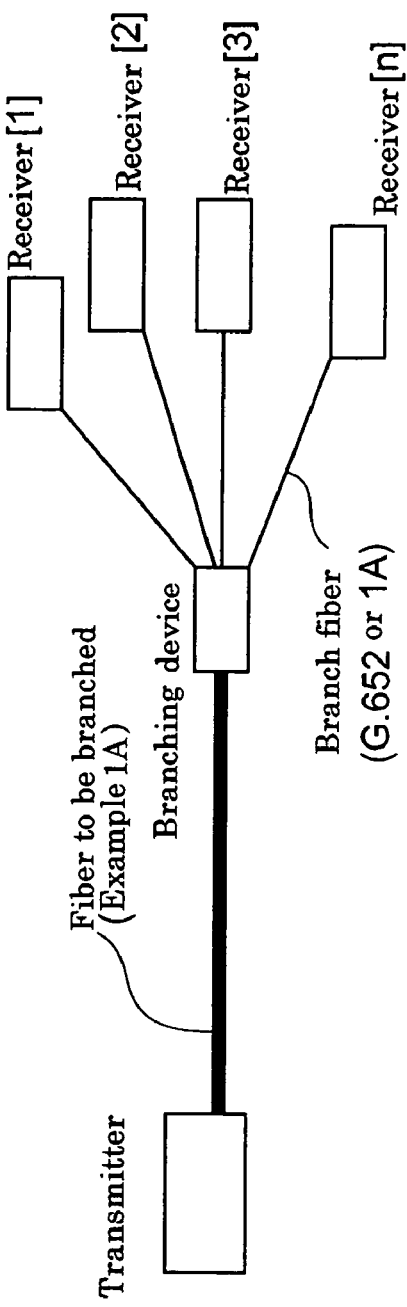
FIG. 5A
FIG. 5B

OPTICAL FIBER

BACKGROUND OF THE INVENTION

1. Field of the Invention

The present invention relates to an optical fiber suitable in use for transmitting optical signals and power.

2. Description of the Background Art

U.S. Pat. No. 6,687,440 has proposed an optical fiber intended to suppress the occurrence of stimulated Brillouin scattering (SBS). This optical fiber is provided with a covering and a cladding region both of which have a longitudinal irregularity in their shape and property in order for an acoustic wave to be radiated radially to suppress SBS. The production of this optical fiber is not easy.

SUMMARY OF THE INVENTION

An object of the present invention is to offer an optical fiber that not only can suppress SBS but also can be produced easily.

To attain the foregoing object, the present invention offers an optical fiber that is specified as follows:

(1) the optical fiber comprises: (a) an optical core region that includes the center axis; (b) an optical cladding region that has a refractive index lower than that of the optical core region and that surrounds the optical core region; and (c) a ring-shaped acoustic core region as a part of the optical core region;

(2) each of the optical core region, the acoustic core region, and the optical cladding region is placed coaxially around the center axis and stretches along the center axis;

(3) a longitudinal-mode acoustic velocity in the acoustic core region is lower than that in the region positioned directly inside the acoustic core region and is lower than that in the region positioned directly outside the acoustic core region;

(4) the longitudinal-mode acoustic velocity in the acoustic core region and the radial thickness of the acoustic core region are predetermined so that a longitudinal-mode acoustic wave that is localized in the acoustic core region and that propagates along the center axis can exist; and (5) the optical fiber has a Brillouin gain spectrum whose 3-dB width is at least 60 MHz.

In the optical fiber of the present invention having the foregoing structure, whereas the amplitude distribution of the optical mode has a shape having a peak at the center position, the amplitude distribution of the acoustic-wave mode has a shape having a peak at each of the center position and the acoustic core region. Consequently, in comparison with conventional optical fibers, in the optical fiber of the present invention, the overlapping between the optical mode and acoustic mode is decreased and the Brillouin gain is decreased. In addition, because the optical fiber is not required to have longitudinal variations in the fiber and covering structures, it can be produced easily.

The optical fiber may have the relationship of $$\frac{t}{\lambda_a}\left\{1-\left(\frac{V_1}{V_0}\right)^2\right\}^{\frac{1}{2}} > 0.35, \quad (1)$$

where: $V_0$ is a longitudinal-mode acoustic velocity in the region directly inside the acoustic core region or a longitudinal-mode acoustic velocity in the region directly outside the acoustic core region, whichever is slower; $V_1$ is a longitudinal-mode acoustic velocity in the acoustic core region; t is a radial thickness of the acoustic core region; and $\lambda_a$ is a wavelength of an acoustic wave and has a value of 0.537 μm.

In accordance with an aspect of the present invention, it is desirable that the optical fiber have the following features: (a) the optical core region is composed of a first region, a second region, and a third region in this order from the inside; (b) the third region is the acoustic core region; (c) each of the first region, the second region, the third region, and the optical cladding region is made of pure silica glass or silica glass doped with $GeO_2$; and (d) when the $GeO_2$ concentration in the first region is denoted as X[1], the $GeO_2$ concentration in the second region as X[2], the $GeO_2$ concentration in the third region as X[3], and the $GeO_2$ concentration in the optical cladding region as X[4], the parameters have the relationship expressed by the formula of $$X[1]>X[2]<X[3]>X[4] \quad (2).$$

In this case, the optical fiber may have the following features: (a) a longitudinal-mode acoustic velocity in the first region is different from that in the third region; (b) a localized acoustic-wave mode exists in the first region and another localized acoustic-wave mode exists in the third region; and (c) a frequency difference of at least 50 MHz exists between the two acoustic-wave modes. In addition, the optical fiber may have the following properties: (a) a mode-field diameter at a wavelength of 1,310 nm lying in the range of 8 to 10 μm; (b) a cable cutoff wavelength of at most 1,260 nm; (c) a zero dispersion wavelength lying in the range of 1,300 to 1,324 nm; (d) a bending loss of at most 4 dB/m at a wavelength of 1,550 nm when the fiber is bent with a diameter of 32 mm; (e) a loss of at most 0.25 dB/km at a wavelength of 1,550 nm; and (f) an SBS threshold value of at least 9 dBm at a wavelength of 1,550 nm when the threshold value is converted into a value at an infinite length.

In accordance with another aspect of the present invention, it is desirable that the optical fiber have the following features: (a) the optical core region is composed of a first region, a second region, and a third region in this order from the inside; (b) the second region is the acoustic core region; (c) each of the first region, the second region, the third region, and the optical cladding region is made of pure silica glass or silica glass doped with the element F; and (d) when the concentration of the element F in the first region is denoted as Y[1], the concentration of the element F in the second region as Y[2], the concentration of the element F in the third region as Y[3], and the concentration of the element F in the optical cladding region as Y[4], the parameters have the relationship expressed by the formula of $$Y[1]<Y[2]>Y[3]<Y[4] \quad (3).$$

BRIEF DESCRIPTION OF THE DRAWING

These and other features, aspects, and advantages of the present invention will become better understood with regard to the following description, appended claims, and accompanying drawings, wherein:

FIGS. 1A to 1C are graphs and a diagram for explaining an optical fiber of a first embodiment of the present invention, in which FIG. 1A is a graph showing a radial distribution of the relative acoustic refractive-index difference $\Delta_a$, FIG. 1B is a graph showing a radial distribution of the relative refractive-index difference $\Delta$, and FIG. 1C is a conceptual diagram showing the structure of the optical fiber.

FIGS. 3A and 3B are graphs for explaining the acoustic mode in the optical fiber of Comparative example 1, in which FIG. 3A shows radial distributions of the relative refractive-index difference $\Delta$ and the relative acoustic refractive-index difference $\Delta_a$, and FIG. 3B shows radial distributions of the acoustic-wave mode amplitude, normalized optical-power density, and normalized refractive index.

FIGS. 4A to 4C are graphs for explaining the acoustic mode in the optical fiber of Example 1A, in which FIG. 4A shows radial distributions of the relative refractive-index difference $\Delta$ and the relative acoustic refractive-index difference $\Delta_a$, and FIGS. 4B and 4C show radial distributions of the acoustic-wave mode amplitude, normalized optical-power density, and normalized refractive index.

FIGS. 5A and 5B are conceptual diagrams of signal distribution systems, in which FIG. 5A shows a system that employs a general-use fiber, and FIG. 5B shows a system that employs the optical fiber of Example 1A.

FIGS. 6A and 6B are graphs for explaining variations in properties of the optical fiber of the first embodiment when the refractive index n[2] of the second core region of the optical fiber is varied, in which FIG. 6A shows variations in the SBS threshold value Pth and the effective core area Aeff, and FIG. 6B shows variations in the normalized threshold value Pth/Aeff and the acoustic core's v value.

FIGS. 8A and 8B are graphs for explaining variations in properties of the optical fiber of the first embodiment when the position of the second core region is varied in the optical fiber, in which FIG. 8A shows the variations in the SBS threshold value Pth and the effective core area Aeff, and FIG. 8B shows the variations in the normalized threshold value Pth/Aeff and the acoustic core's v value.

FIGS. 10A to 10C are graphs for explaining the acoustic mode in the optical fiber of Example 1B, in which FIG. 10A shows radial distributions of the relative refractive-index difference $\Delta$ and the relative acoustic refractive-index difference $\Delta_a$, and FIGS. 10B and 10C show radial distributions of the acoustic-wave mode amplitude, normalized optical-power density, and normalized refractive index.

FIGS. 12A to 12C are graphs for explaining the acoustic mode in the optical fiber of Example 1C, in which FIG. 12A shows radial distributions of the relative refractive-index difference $\Delta$ and the relative acoustic refractive-index difference $\Delta_a$, and FIGS. 12B and 12C show radial distributions of the acoustic-wave mode amplitude, normalized optical-power density, and normalized refractive index.

FIGS. 13A to 13C are graphs and a diagram for explaining an optical fiber of a second embodiment, in which FIG. 13A is a graph showing a radial distribution of the relative acoustic refractive-index difference $\Delta_a$, FIG. 13B is a graph showing a radial distribution of the relative refractive-index difference $\Delta$, and FIG. 13C is a conceptual diagram showing the structure of the optical fiber.

FIGS. 15A and 15B are graphs for explaining the acoustic mode in the optical fiber of Comparative example 2, in which FIG. 15A shows radial distributions of the relative refractive-index difference $\Delta$ and the relative acoustic refractive-index difference $\Delta_a$, and FIG. 15B shows radial distributions of the acoustic-wave mode amplitude, normalized optical-power density, and normalized refractive index.

FIGS. 16A to 16C are graphs for explaining the acoustic mode in the optical fiber of Example 2, in which FIG. 16A shows radial distributions of the relative refractive-index difference $\Delta$ and the relative acoustic refractive-index difference $\Delta_a$, and FIGS. 16B and 16C show radial distributions of the acoustic-wave mode amplitude, normalized optical-power density, and normalized refractive index.

DETAILED DESCRIPTION OF THE INVENTION

Figure 1A:
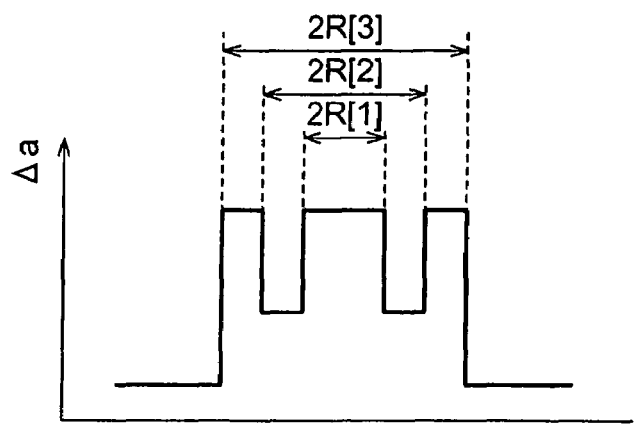

First, the analytical technique the present inventors have developed is explained below. According to this analytical technique, an acoustic-mode equation is solved by using the full-vector finite element method to evaluate the overlapping between the optical mode and acoustic mode.

In this analytical technique, an acoustic-mode equation is solved by converting the refractive-index distribution of the optical fiber into the composition distribution. More specifically, first, by using Eqs. (4) to (7), which are described in Literature 1 (Y. Koyamada et al., J. Lightwave Techn. Vol. 22, No. 2, pp. 631-639, 2004), the refractive-index distribution is converted into the composition distribution to obtain the acoustic velocity and medium density.

$$\Delta = 1.0 \times 10^{-1} w_{GeO2} - 3.3 \times 10^{-1} w_F \qquad (4)$$

$$V_L = 5944(1 - 7.2 \times 10^{-3} w_{GeO2} - 2.7 \times 10^{-2} w_F) \qquad (5)$$

$$V_S = 3749(1 - 6.4 \times 10^{-3} w_{GeO2} - 2.7 \times 10^{-2} w_F) \qquad (6)$$

$$\rho = 2202(1 + 6.4 \times 10^{-3} w_{GeO2} - 3.4 \times 10^{-3} w_F) \qquad (7)$$

Here, $\Delta$ [%] denotes the relative refractive-index difference, $w_{GeO2}$ the concentration of $GeO_2$ doped in $SiO_2$, $w_F$ the concentration of the element F doped in $SiO_2$, $V_L$ (m/s) the acoustic velocity of the longitudinal mode, $V_S$ (m/s) the acoustic velocity of the shear mode, and $\rho$ (kg/m$^3$) medium density.

Here, the medium is assumed to be isotropic. As a result, the elastic matrix [c] is expressed as the two components $c_{11}$ and $c_{44}$. The elastic constant can be obtained by using Eq. (8).

$$c_{11} = \rho V_L^2, \quad c_{44} = \rho V_S^2 \qquad (8)$$

Next, the acoustic mode is obtained by substituting the distribution of the acoustic velocity into the mode equation (9).

$$\rho \partial^2 u / \partial t^2 = \nabla \cdot ([c] \nabla_s u) \qquad (9)$$

Here, u is the displacement vector of the acoustic mode and takes the functional form expressed by Eq. (10).

$$u(r,\theta,z,t) = u_T(r,\theta) \exp[j(\omega t - k_a z)] \qquad (10)$$

In the spatial coordinate system, the z axis represents the longitudinal direction of the fiber.

As is widely known by Literature 2 (G. P. Agrawal, "Nonlinear fiber optics," Academic Press, 1989, Sec. 9.1), for example, the acoustic mode contributing to SBS has a propagation constant as shown in Eq. (11).

$$k_a = 4\pi n / \lambda \qquad (11),$$

where $\lambda$ denotes the wavelength of light and n denotes the refractive index. Consequently, the angular frequency $\omega$ and the displacement vector distribution u of the acoustic mode can be obtained from the wavelength of light $\lambda$ and the refractive-index distribution $\Delta(r,\theta)$.

On the other hand, the electric-field distribution E of the optical mode can be obtained from the light's wavelength λ and the refractive-index distribution Δ(r,θ) by solving a wave equation derived from the Maxwell equation. By using these, the average amplitude $<\Delta\rho>/\rho_0$ of the acoustic wave the light senses can be obtained by using Eq. (12).

$$<\Delta\rho>/\rho_0 = k_a \int u_z(r,\theta) \cdot |E(r,\theta)|^2 r dr d\theta \quad (12).$$

Here, Δρ is the variation in the medium density due to the acoustic wave and can be given by Eq. (13).

$$\Delta\rho = \rho_0 \nabla \cdot u \cong i\rho_0 k_a u_z \quad (13).$$

In addition, the displacement vector u of the acoustic wave and the electric field E of the light are normalized as shown in Eqs. (14) and (15).

$$\int |E(r,\theta)|^2 r dr d\theta = 1 \quad (14).$$

$$Re[\int -i\omega_a(\{[c]\nabla_s u\} \cdot u^*)_z r dr d\theta] = 1 \quad (15).$$

In the following description, two embodiments of the present invention accomplished based on the study using this analytical technique are explained in comparison with Comparative examples.

First Embodiment

Figure 1B:
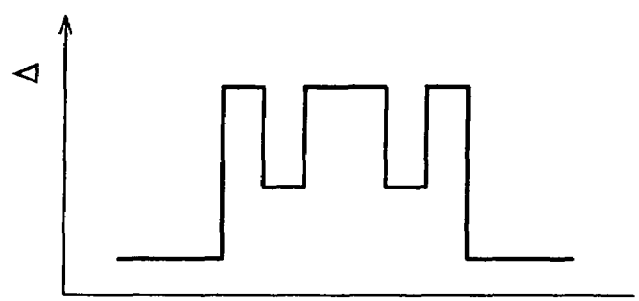
Figure 1C:
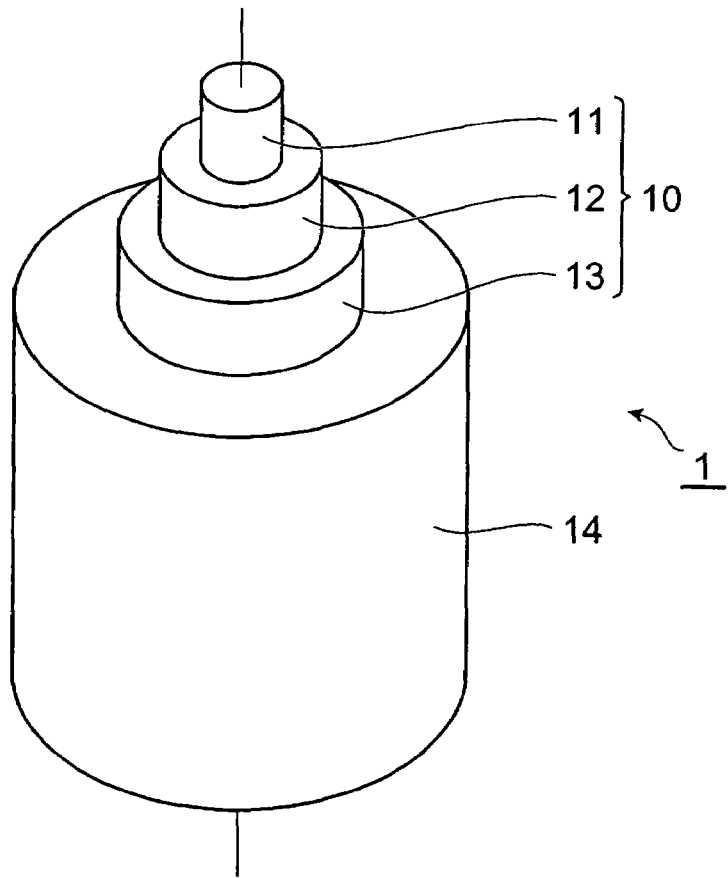

FIGS. 1A to 1C are graphs and a diagram for explaining an optical fiber 1 of a first embodiment of the present invention. FIG. 1A is a graph showing a radial distribution of the relative acoustic refractive-index difference $\Delta_a$. FIG. 1B is a graph showing a radial distribution of the relative refractive-index difference Δ. FIG. 1C is a conceptual diagram showing the structure of the optical fiber. The optical fiber 1 comprises an optical core region 10 including the center axis indicated by alternate long and short dashed lines in FIG. 1 and an optical cladding region 14 surrounding the optical core region 10. The optical core region 10 is composed of a first region 11, a second region 12, and a third region 13 in this order from the inside. The individual regions are placed coaxially around the center axis and stretch along the center axis.

The average refractive index of the optical core region 10 is higher than the refractive index of the optical cladding region 14. Therefore, the optical fiber 1 can localize the propagation mode of light in the optical core region 10 to enable the light to be guided. In the first embodiment, the third region 13, which is a part of the optical core region 10, is a ring-shaped acoustic core region. The propagation mode of the acoustic wave can be localized in the third region 13 (acoustic core region).

The refractive indexes of the first region 11, the second region 12, the third region 13, and the optical cladding region 14 are denoted as n[1], n[2], n[3], and n[4], respectively. The relative refractive-index differences of the first region 11, the second region 12, the third region 13, and the optical cladding region 14 are denoted as Δ[1], Δ[2], Δ[3], and Δ[4], respectively. The relative refractive-index difference Δ[k] of the individual regions is expressed as Eq. (16) using the refractive index n[k] of the individual regions and the refractive index $n_0$ of pure silica glass.

$$\Delta[k] = \frac{n[k]}{n_0} - 1. \quad (16)$$

In this case, the relationship in the magnitude of refractive index between the individual regions and the relationship in the magnitude of relative refractive-index difference between the individual regions are shown by Formula (17) (FIG. 1B).

$$n[1] > n[2] < n[3] > n[4] \quad (17a).$$

$$\Delta[1] > \Delta[2] < \Delta[3] > \Delta[4] \quad (17b).$$

The longitudinal-mode acoustic velocities in the first region 11, the second region 12, the third region 13, and the optical cladding region 14 are denoted as V[1], V[2], V[3], and V[4], respectively. The relative acoustic refractive-index differences of the first region 11, the second region 12, the third region 13, and the optical cladding region 14 are denoted as $\Delta_a[1]$, $\Delta_a[2]$, $\Delta_a[3]$, and $\Delta_a[4]$, respectively. The relative acoustic refractive-index difference $\Delta_a[k]$ of the individual regions is expressed as Eq. (18) using the longitudinal-mode acoustic velocity V[k] in the individual regions and the longitudinal-mode acoustic velocity $V_0$ in pure silica glass.

$$\Delta_a[k] = \frac{V_0}{V[k]} - 1. \quad (18)$$

In this case, the relationship in the magnitude of longitudinal-mode acoustic velocity between the individual regions and the relationship in the magnitude of relative acoustic refractive-index difference are expressed as Formula (19) (FIG. 1A).

$$V[1] < V[2] > V[3] < V[4] \quad (19a).$$

$$\Delta_a[1] > \Delta_a[2] < \Delta_a[3] > \Delta_a[4] \quad (19b).$$

The refractive index and longitudinal-mode acoustic velocity in the individual regions are not required to be strictly uniform. When not uniform, an average value weighted by the volume in that region can be used.

As described above, the longitudinal-mode acoustic velocity V[3] in the third region 13 (acoustic core region) is lower than the longitudinal-mode acoustic velocity V[2] in the second region 12, which is positioned directly inside the third region 13, and is lower than the longitudinal-mode acoustic velocity V[4] in the optical cladding region 14, which is positioned directly outside the third region 13. The longitudinal-mode acoustic velocity in the third region 13 and the radial thickness of the third region 13 are predetermined so that a longitudinal-mode acoustic wave is localized in the third region 13 and propagates along the center axis can exist. It is desirable that each of the first region 11, the second region 12, the third region 13, and the optical cladding region 14 be made of pure silica glass or silica glass doped with $GeO_2$. When the $GeO_2$ concentrations in the first region 11, the second region 12, the third region 13, and the optical cladding region 14 are denoted as X[1], X[2], X[3], and X[4], respectively, the parameters have the relationship expressed by Formula (20).

$$X[1] > X[2] < X[3] > X[4] \quad (20).$$

In this case, the production of the optical fiber is particularly easy.

It is also desirable that the longitudinal-mode acoustic velocity in the first region 11 be different from that in the third region 13, that a localized acoustic-wave mode exist in the first region 11 and another localized acoustic-wave mode exist in the third region 13, and that a frequency difference of at least 50 MHz exist between the two acoustic-wave modes. As described above, by providing a frequency difference between the acoustic-wave mode localized in the first core region 11 and the acoustic-wave mode localized in the third core region 13, the peak height of the Brillouin gain spectrum can be reduced and the SBS threshold value can be increased.

It is also desirable that (a) the mode-field diameter at a wavelength of 1,310 nm lie in the range of 8 to 10 μm, (b) the cable cutoff wavelength be at most 1,260 nm, (c) the zero dispersion wavelength lie in the range of 1,300 to 1,324 nm, (d) the bending loss at a wavelength of 1,550 nm be at most 4 dB/m when the fiber is bent with a diameter of 32 mm, (e) the loss at a wavelength of 1,550 nm be at most 0.25 dB/km, and (f) the SBS threshold value at a wavelength of 1,550 nm be at least 9 dBm when the threshold value is converted into a value at an infinite length. When these conditions are fulfilled, the optical fiber 1 in this embodiment can improve the SBS threshold value while maintaining the compatibility with an ITU-T G.652 fiber, which is widely used.

Next, an optical fiber of Example 1A, which is a concrete example for the optical fiber 1 of the first embodiment, is explained below together with an optical fiber of Comparative example 1. In the optical fiber of Example 1A, when the outer radii of the first region 11, the second region 12, and the third region 13 are denoted as R[1], R[2], and R[3], respectively, the ratio of the diameter of the first region 11 to that of the second region 12, i.e., R[1]/R[2], is 0.52 and the ratio of the diameter of the second region 12 to that of the third region 13, i.e., R[2]/R[3], is 0.69 and the third region 13 has a diameter, 2R[3], of 10.57 μm. Other features are shown in Table I.

TABLE I

| | $GeO_2$ concentration $X[k]$ mol % | Relative refractive-index difference $\Delta[k]$ % | Longitudinal-mode acoustic velocity $V[k]$ m/s |
|---|---|---|---|
| First region | 4.36 | 0.45 | 5751 |
| Second region | 1.93 | 0.20 | 5858 |
| Third region | 4.36 | 0.45 | 5751 |
| Optical cladding region | 0 | 0 | 5944 |

On the other hand, the optical fiber of Comparative example 1 has a step-index-type refractive-index profile. In this optical fiber, the core region is made of silica glass doped with $GeO_2$, the cladding region is made of pure silica glass, and the core region has a uniform relative refractive-index difference of 0.45% and a diameter, 2R, of 8.89 μm.

Table II shows the following properties of the optical fibers of Example 1A and Comparative example 1: the effective core area Aeff, Brillouin gain-peak frequency, SBS peak gain, and SBS threshold value (converted into a value at an infinite length).

TABLE II

| | Example 1A | Comparative example 1 |
|---|---|---|
| Effective core-area Aeff μm² | 83.6 | 83.7 |
| Peak gain frequency GHz | 10.734 | 10.724 |
| Peak gain dB | −9.32 | −6.73 |
| SBS threshold value dBm | 9.32 | 6.73 |

Figure 2:
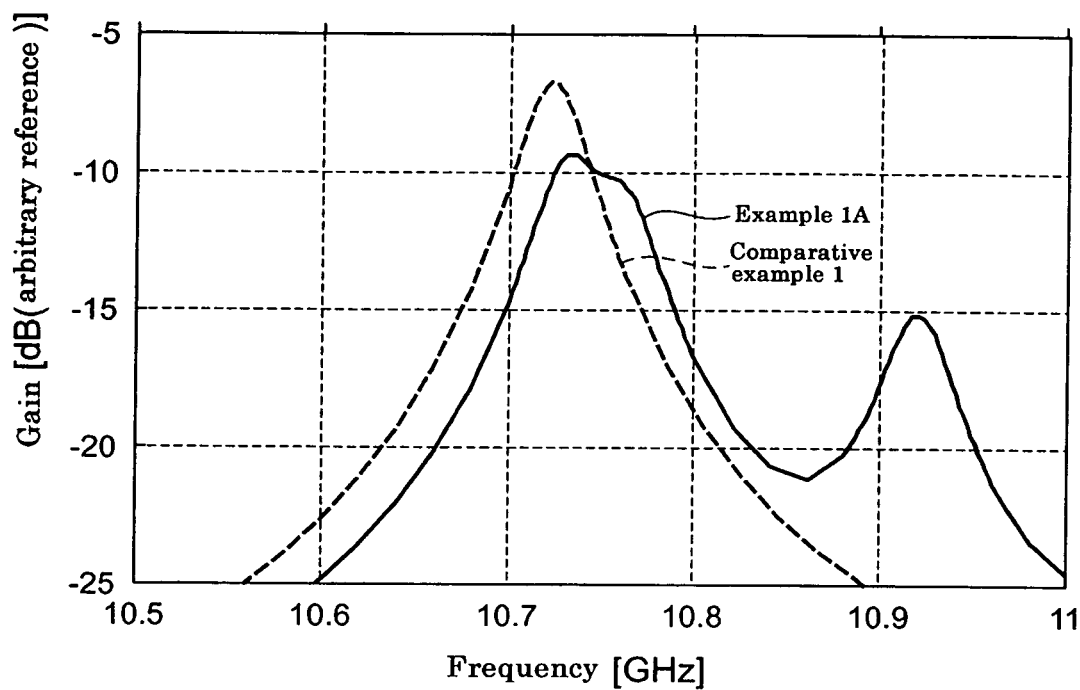
FIG. 2 is a graph showing the Brillouin gain spectra of the optical fibers of Example 1A and Comparative example 1.

FIG. 2 is a graph showing the Brillouin gain spectra of the optical fibers of Example 1A and Comparative example 1. The calculated results shown in Table II and FIG. 2 are obtained by solving Eq. (9) using the full-vector finite element method to evaluate the overlapping between the optical mode and acoustic mode by using Eq. (12). The calculated results show the values at a wavelength of 1,550 nm.

The effective core areas of the optical fibers of Example 1A and Comparative example 1 are about 84 μm² and are nearly equal to each other. Consequently, the optical-power density distributions in both optical fibers are nearly the same. In the Brillouin gain spectrum, however, the optical fiber of Example 1A has a wider peak width and a smaller peak value than those of the optical fiber of Comparative example 1.

The reason is that although the acoustic mode having a large overlapping with the optical mode is composed of only one mode having its peak at the center in the case of the optical fiber of Comparative example 1, two modes exist in the case of the optical fiber of Example 1A; one mode having its peak at the center and the other mode having its peak at the third core region 13. Such a difference in Brillouin gain results from the difference in the behavior of the acoustic mode in the individual fibers as shown in FIGS. 3A and 3B and FIGS. 4A to 4C.

Figure 3A:
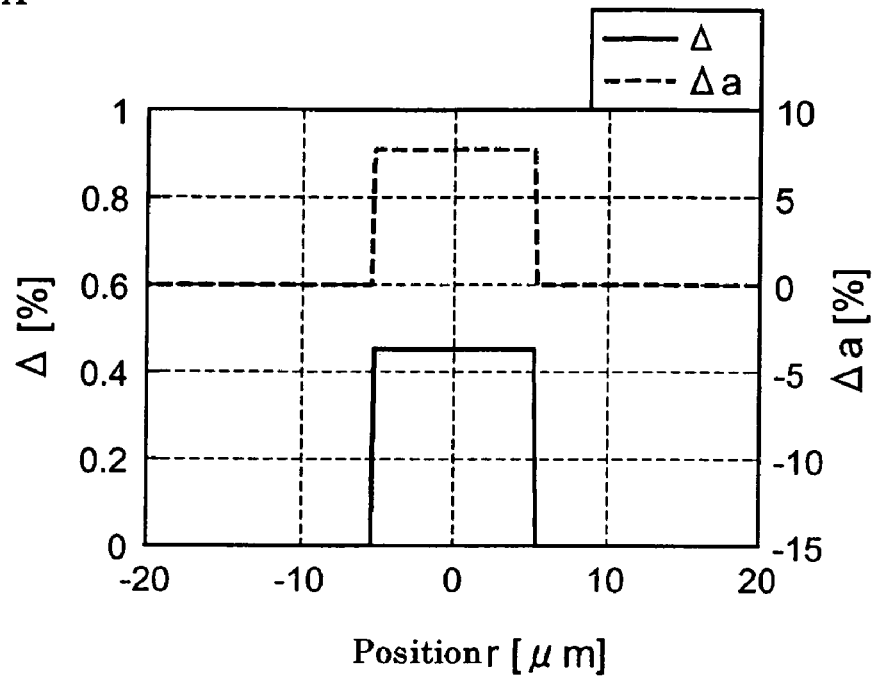
Figure 3B:
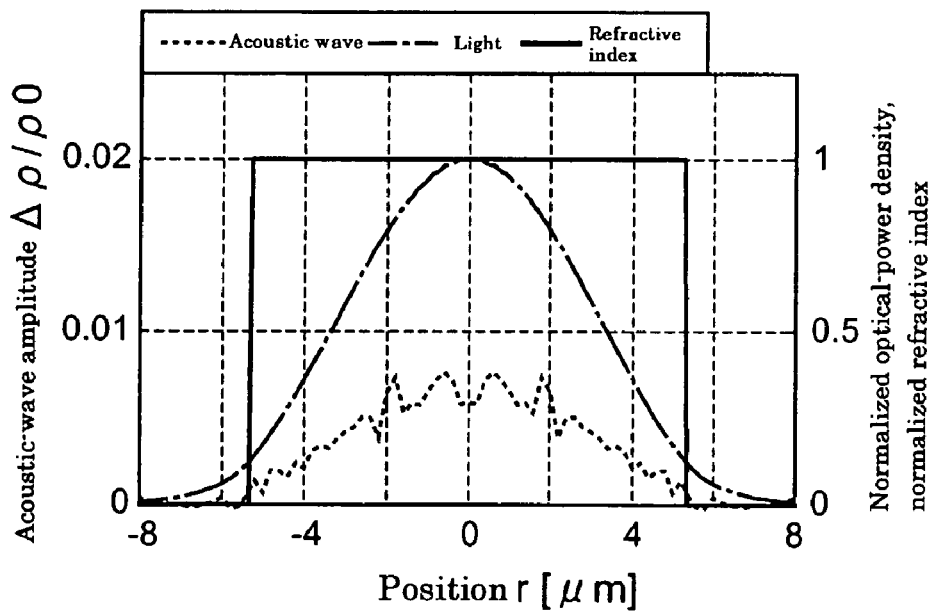
Figure 4A:
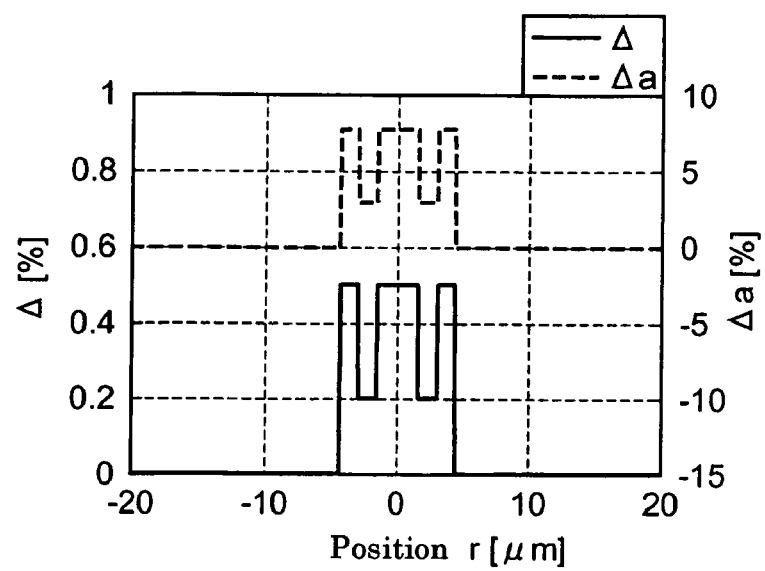
Figure 4B:
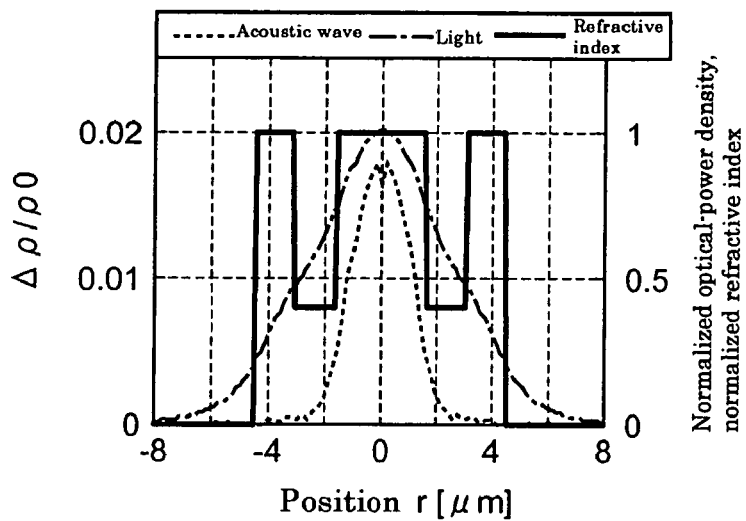
Figure 4C:
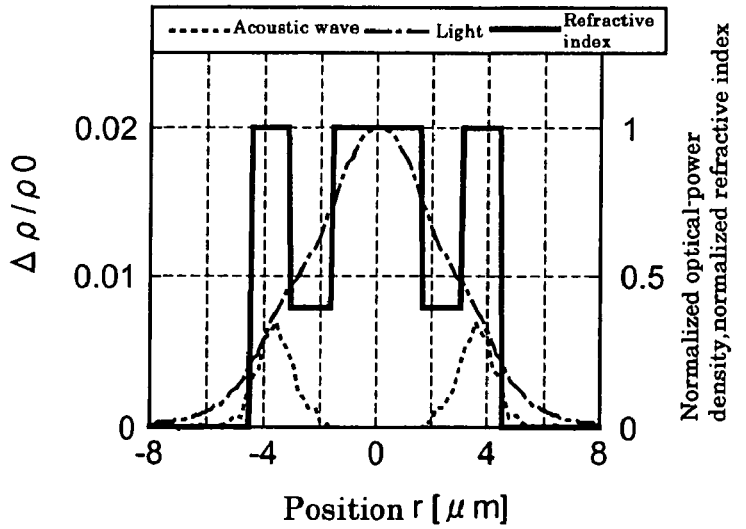

FIGS. 3A and 3B are graphs for explaining the acoustic mode in the optical fiber of Comparative example 1. FIG. 3A shows radial distributions of the relative refractive-index difference $\Delta$ and the relative acoustic refractive-index difference $\Delta_a$. FIG. 3B shows radial distributions of the acoustic-wave mode amplitude $\Delta\rho/\rho_0$, normalized optical-power density, and normalized refractive index. FIGS. 4A to 4C are graphs for explaining the acoustic mode in the optical fiber of Example 1A. FIG. 4A shows radial distributions of the relative refractive-index difference $\Delta$ and the relative acoustic refractive-index difference $\Delta_a$. FIGS. 4B and 4C show radial distributions of the acoustic-wave mode amplitude $\Delta\rho/\rho_0$, normalized optical-power density, and normalized refractive index. FIGS. 4B and 4C show the radial distributions for two acoustic modes different from each other.

In FIG. 3B and FIGS. 4B and 4C, the acoustic-wave mode amplitude $\Delta\rho/\rho_0$ is given by Eq. (12). The normalization of the optical-power density and refractive index is performed such that the minimum value becomes 0 and the maximum value becomes 1.

As can be seen from FIG. 3B, in the optical fiber of Comparative example 1, the optical mode and the acoustic-wave mode each have a radial distribution having a shape similar to each other, and therefore the overlapping is large. More specifically, the overlapping $<\Delta\rho>/\rho_0$ between the acoustic mode and the optical mode is as large as 0.0036 at an acoustic-wave mode frequency of 10.723 GHz. As a result, the peak value in the Brillouin gain spectrum is large.

On the other hand, as can be seen from FIG. 4A, the optical fiber of Example 1A has an optical core region 10 in which the second region 12 has a relative acoustic refractive-index difference, $\Delta_a$, smaller than that of the first region 11 and the third region 13. This condition concurrently produces an acoustic-wave mode that has a frequency of 10.732 GHz and that is localized in the first core region 11 as shown in FIG. 4B and another acoustic-wave mode that has a frequency of 10.762 GHz and that is localized in the third core region 13 as shown in FIG. 4C. The overlapping between the acoustic-wave mode having a frequency of 10.732 GHz and the optical mode is 0.0026, and the overlapping between the acoustic-wave mode having a frequency of 10.762 GHz and the optical mode is 0.002. Those overlappings are smaller than the overlapping in Comparative example 1. As a result, at the frequency of each acoustic-wave mode, a Brillouin gain smaller than that in Comparative example 1 is produced. In addition, because of the difference of 30 MHz in the frequency at which the Brillouin gain is produced, Example 1A, in the end, broadens the width of and decreases the height of the peak in the Brillouin gain spectrum in comparison with Comparative example 1.

Here, the expanse of the peak width of the Brillouin gain spectrum can be evaluated using the 3-dB-width, $\Delta f_{3\,dB}$, given by Eq. (21).

$$\Delta f_{3\,dB} = \int_{g(f) > g_0/2} df \tag{21}$$

Here, $g(f)$ is the Brillouin gain spectrum, and $g_0$ is the peak gain in the spectrum. The Brillouin gain spectra in FIG. 2 show that whereas the 3-dB width, $\Delta f_{3dB}$, is 40 MHz for the optical fiber of Comparative example 1, the 3-dB width, $\Delta f_{3dB}$, is 63 MHz for the optical fiber of Example 1A. This result shows that the peak width of the Brillouin gain spectrum of the optical fiber of Example 1A is increased.

As is widely known by Literature 3 (A. Hook et al., J. Lightwave Techn. Vol. 10, No. 4, pp. 493-502, 1992), for example, when the peak height of the Brillouin gain spectrum is denoted as $P_0$, the SBS threshold value Pth is expressed as "$P_{th}$=constant-$P_0$." In Example 1A, the SBS threshold value becomes higher than that in Comparative example 1. In other words, in Example 1A, the optical power that can be transmitted without producing SBS is higher than that in Comparative example 1. In the above description, the SBS threshold value is expressed as the value when the fiber is infinitely long and the effective fiber length can be approximated by $1/\alpha$, where $\alpha$ is the loss coefficient. As shown in Literature 2, the SBS threshold value is proportional to the effective fiber length. Consequently, based on this relationship, the SBS threshold value for any given fiber length can be predicted.

As in the case of Example 1A, when the optical core region 10 has two separated regions such as the first core region 11 and the third core region 13 to enable a localized acoustic-wave mode to exist in each of the first core region 11 and the third core region 13, the overlapping between the light and acoustic wave can be decreased, which is desirable.

Other optical properties of the optical fiber of Example 1A are as follows: (a) the mode-field diameter at a wavelength of 1,310 nm is 9.2 μm, (b) the cable cutoff wavelength is 1.24 μm, (c) the 32-mm-diameter bending loss at a wavelength of 1,550 nm is 0.036 dB/m, and (d) the zero dispersion wavelength is 1.303 μm. These properties can fulfill the specifications of the ITU-T G.652D. Therefore, the optical fiber of Example 1A can increase the SBS threshold value to transmit an increased amount of optical power while maintaining the compatibility with the G.652 fiber, which is widely used at the present.

The compatibility with the G.652 fiber with respect to the properties such as the chromatic dispersion and mode-field diameter is important because this feature enables an increase in transmission capacity and distance by using transmitters, receivers, and other transmission apparatus which are developed for the G.652 fiber and have been widely used.

FIGS. 5A and 5B are conceptual diagrams of signal distribution systems. FIG. 5A shows a system that employs a general-use fiber. FIG. 5B shows a system that employs the optical fiber of Example 1A. In the signal distribution systems shown in FIGS. 5A and 5B, to distribute sufficient optical power to branch lines connected to individual receivers, a transmitter is required to inject a large amount of optical power into a line to be branched. In this case, signal distortion due to SBS poses a problem in distributing analog video signals, in particular. Conventionally, as shown in FIG. 5A, a line has generally been constituted by using a general-use G.652 fiber. On the other hand, the constituting of a line using the optical fiber of Example 1A having a high SBS threshold value, as shown in FIG. 5B, not only increases the optical power that can be inputted into a line to be branched so that the transmission distance can be extended, the SN ratio of the received signal can be improved, and the number of branches can be increased but also can maintain the cost at a low level by utilizing conventional transmitters and receivers.

Figure 6A:
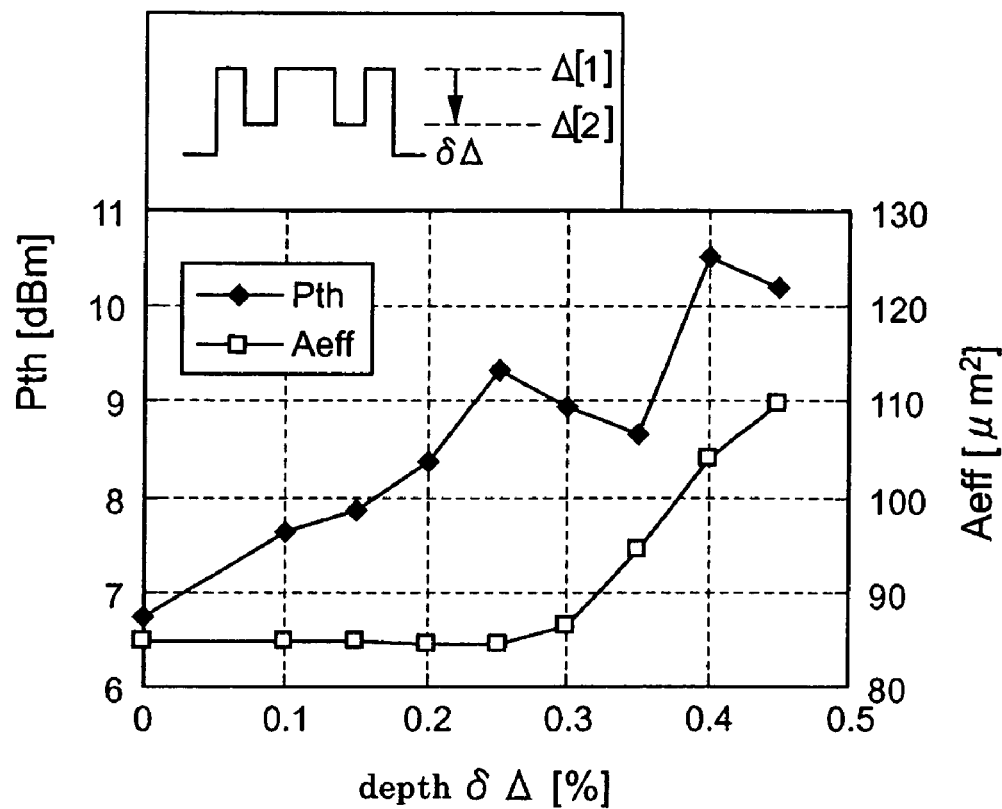
Figure 6B:
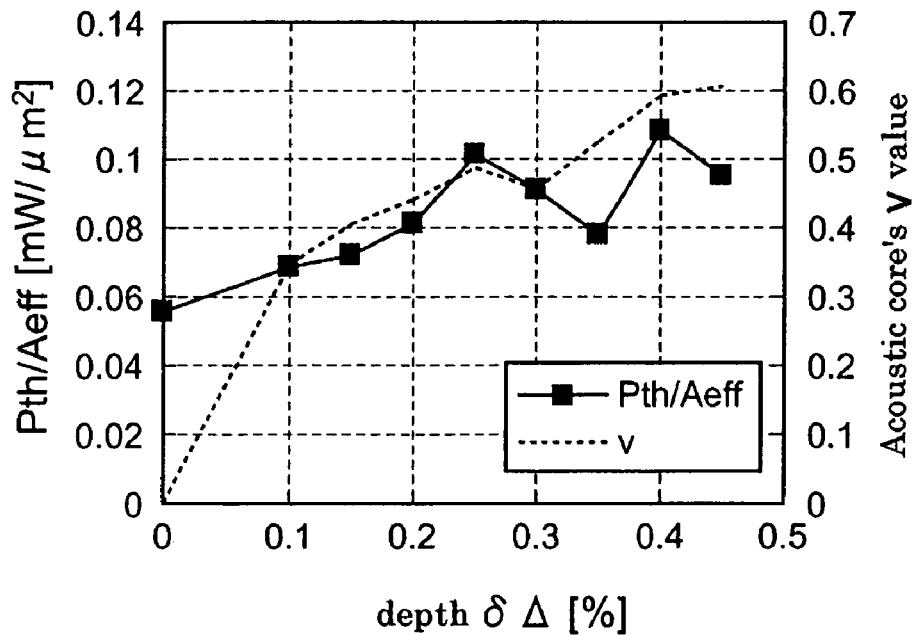

FIGS. 6A and 6B are graphs for explaining variations in properties of the optical fiber 1 of the first embodiment when the refractive index n[2] of the second core region 12 of the optical fiber 1 is varied. FIG. 6A shows variations in the SBS threshold value Pth and the effective core area Aeff. FIG. 6B shows variations in the normalized threshold value Pth/Aeff and the acoustic core's v value. Each of the relative refractive-index difference Δ[1] of the first core region 11 and the relative refractive-index difference Δ[3] of the third core region 13 was fixed at 0.45%, and the relative refractive-index difference Δ[2] was varied by varying the depth of the second core region 12, which is δΔ defined by the equation "Δ[2]=Δ[1]−δΔ." In this case, the core diameter 2R[3] was predetermined such that the effective core area Aeff was uniform at about 85 μm². The ratio "R[1]/R[2]" was fixed at 0.52, and the ratio "R[2]/R[3]" was fixed at 0.69.

As shown in FIG. 6A, as the depth δΔ of the second core region 12 is increased from 0 (corresponding to Comparative example 1), the SBS threshold value Pth increases. When the depth δΔ reaches 0.25% (corresponding to Example 1A), the SBS threshold value Pth takes a maximum value of 9.33 dBm, showing an increment of 2.60 dB from 6.73 dBm, which is the value obtained when the second core region 12 is not provided (δΔ=0). The fact that the SBS threshold value Pth increases in proportion to the effective core area Aeff is known by Literature 2, for example. As shown in FIG. 6B, however, the normalized threshold value Pth/Aeff, which is obtained by dividing the SBS threshold value Pth by the effective core area Aeff, also takes a maximum value when δΔ reaches 0.25%. This result shows that other principle, rather than the known principle of the increase in proportion to the effective core area Aeff, increases the SBS threshold value Pth.

In addition, as the acoustic core×s v value defined by Eq. (22) increases, the confinement of the acoustic wave in the third core region 13, which is the acoustic core region, is intensified.

$$v = \frac{t}{\lambda_a} \left\{ 1 - \left( \frac{V_1}{V_0} \right)^2 \right\}^{\frac{1}{2}}, \tag{22}$$

where: $\lambda_a$ is a wavelength of the acoustic wave; t is a radial thickness of the third core region 13, which is the acoustic core region; $V_1$ is a longitudinal-mode acoustic velocity in the third core region 13; and $V_0$ is a longitudinal-mode acoustic velocity in the region directly inside the third core region 13 or a longitudinal-mode acoustic velocity in the region directly outside the third core region 13, whichever is slower (in this case, a longitudinal-mode acoustic velocity in the second core region 12). For FIG. 6B, $\lambda_a$ is 0.537 μm. This value is obtained by substituting the wave number $k_a$=11.7/μm into "$\lambda_a = 2\pi/k_a$." Here, $k_a$ is obtained by substituting the light's wavelength λ=1.55 μm and the refractive index n=1.444 into Eq. (11).

As shown in FIG. 6B, when the acoustic core's v value is greater than about 0.35, the SBS threshold value Pth becomes high. In other words, in this case, the propagation mode of the acoustic wave can be localized in the ring-shaped acoustic core intensely. As a result, the stimulated Brillouin scattering can be suppressed sufficiently.

In addition, when the depth δΔ is 0.40%, Pth becomes a second maximum value of 10.52 dBm. However, in the range where δΔ is larger than 0.3%, the effective core area Aeff increases because the confinement of the light is weakened. Consequently, when the priority is given to the increase in SBS threshold value, the depth δΔ can be increased to 0.40%. Nevertheless, by employing a value of about 0.25% as the depth δΔ, the SBS threshold value can be increased while practically maintaining the optical property that can be attained when the second core region 12 is not provided. The reason is that when the depth δΔ of the second core region 12 is 0.25%, the distribution of the acoustic-mode amplitude can be varied without practically varying the distribution of the light's electric field. This principle can be applied not only to this embodiment but also to other fiber structures.

Figure 7:
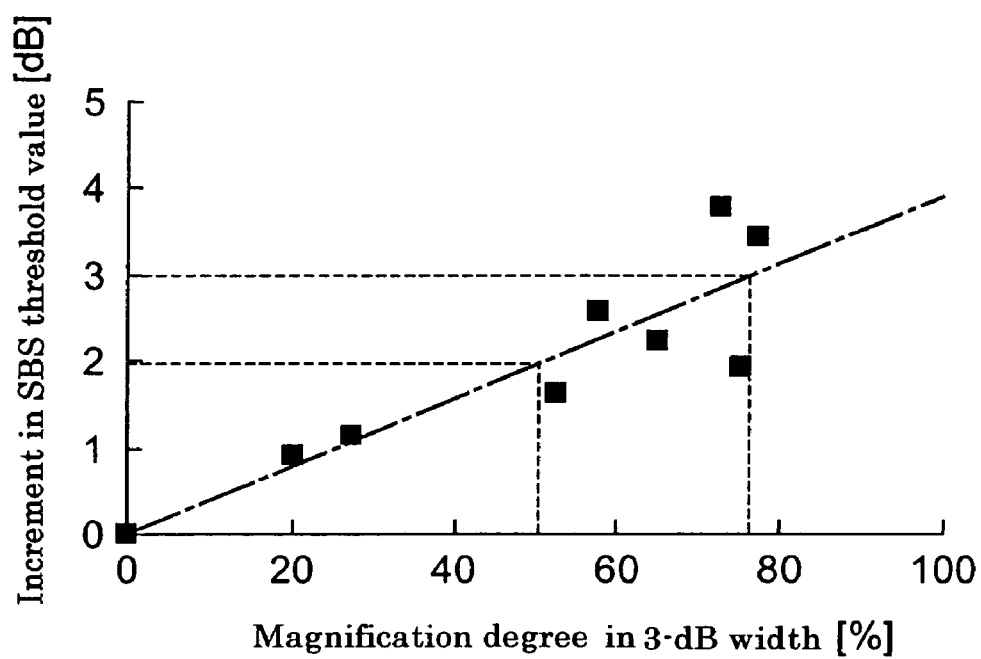
FIG. 7 is a graph showing the relationship between the peak width of the Brillouin gain spectrum and the SBS threshold value in the optical fiber of the first embodiment.

In the example shown in FIG. 6A, the SBS threshold value increases with increasing δΔ. In this case, the peak width of the Brillouin gain spectrum also increases. FIG. 7 is a graph showing the relationship between the peak width of the Brillouin gain spectrum and the SBS threshold value in the optical fiber 1 of the first embodiment. The horizontal axis of FIG. 7 represents the 3-dB-width magnification degree $(\Delta f_{3dB}/\Delta f_0 - 1) \times 100(\%)$, which expresses the relative value of magnification of the 3-dB width from the 3-dB width, $f_0$, in the case of δΔ=0 (Comparative example 1). The vertical axis represents the increment in the SBS threshold value using the value in the case of δΔ=0 (Comparative example 1) as the reference. FIG. 7 shows that the SBS threshold value increases with increasing 3-dB width. When the 3-dB-width magnification degree is set at 50%, the SBS threshold value increases by about 2 dB. This increase enables the increase in the transmission distance, transmission capacity, and number of branches, which is desirable. Furthermore, when the 3-dB-width magnification degree is set at 75%, the SBS threshold value increases by about 3 dB, which is more desirable.

Figure 8A:
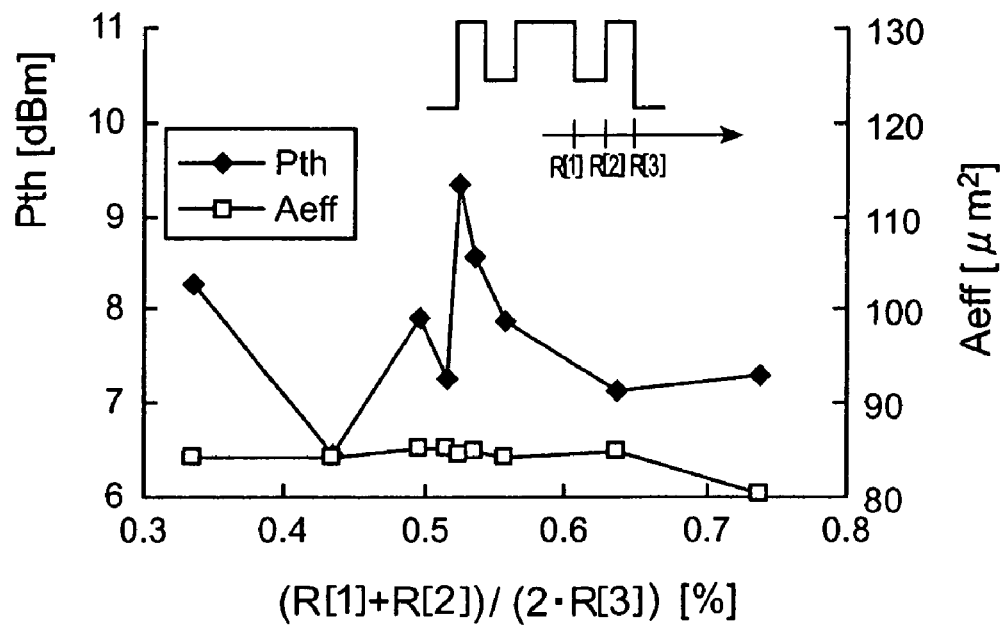
Figure 8B:
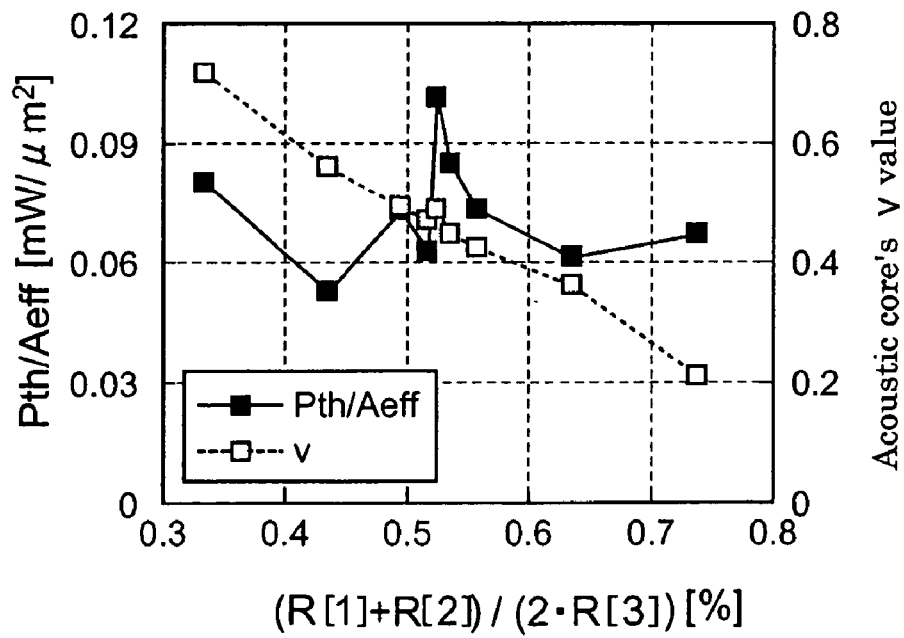

FIGS. 8A and 8B are graphs for explaining variations in properties of the optical fiber 1 of the first embodiment when the position of the second core region 12 is varied in the optical fiber 1. FIG. 8A shows the variations in the SBS threshold value Pth and the effective core area Aeff, and FIG. 8B shows the variations in the normalized threshold value Pth/Aeff and the acoustic core's v value.

The relative width d(=(R[2]−R[1])/R[3]) of the second core region 12 was fixed at 0.33, and the relative position p(=(R[2]+R[1])/2R[3]) of the second core region 12 was varied. In this case, the core diameter 2R[3] was determined such that the effective core area Aeff was uniform at about 85 μm². The relative refractive-index difference Δ[1] of the first core region 11 was fixed at 0.45%, the relative refractive-index difference Δ[2] of the second core region 12 was fixed at 0.20%, the relative refractive-index difference Δ[3] of the third core region 13 was fixed at 0.45%, and the relative refractive-index difference Δ[4] of the optical cladding region 14 was fixed at 0%. As shown in FIG. 8A, when the relative position p of the second core region 12 is varied from 0.3 to 0.8, the SBS threshold value takes a maximum value when the position p lies at 0.524. This result shows that the position p=0.524 is the optimum position in Example 1A.

Next, an optical fiber of Example 1B, which is another concrete example for the optical fiber 1 of the first embodiment, is explained below. In the optical fiber of Example 1B, when the outer radii of the first region 11, the second region 12, and the third region 13 are denoted as R[1], R[2], and R[3], respectively, the ratio of the diameter of the first region 11 to that of the second region 12, i.e., R[1]/R[2], is 0.50 and the ratio of the diameter of the second region 12 to that of the third region 13, i.e., R[2]/R[3], is 0.60 and the third region 13 has a diameter, 2R[3], of 8.27 μm. Other features are shown in Table III.

TABLE III

| | GeO₂ concentration X[k] mol % | Relative refractive-index difference Δ[k] % | Longitudinal-mode acoustic velocity V[k] m/s |
|---|---|---|---|
| First region | 4.36 | 0.45 | 5751 |
| Second region | 1.93 | 0.20 | 5858 |
| Third region | 2.29 | 0.31 | 5811 |
| Optical cladding region | 0 | 0 | 5944 |

The v value obtained by using Eq. (22) becomes 0.39. In this case, $\lambda_a$ is assumed to be 0.537 μm.

Table IV summarizes the following features of the optical fiber of Example 1B: the effective core area Aeff, the Brillouin gain-peak frequency, the SBS peak gain, and the SBS threshold value (converted into a value at an infinite length).

TABLE IV

| | Example 1B |
|---|---|
| Effective core area Aeff μm² | 88.8 |
| Peak gain frequency GHz | 10.784 |
| Peak gain dB | −10.29 |
| SBS threshold value dBm | 10.29 |

Figure 9:
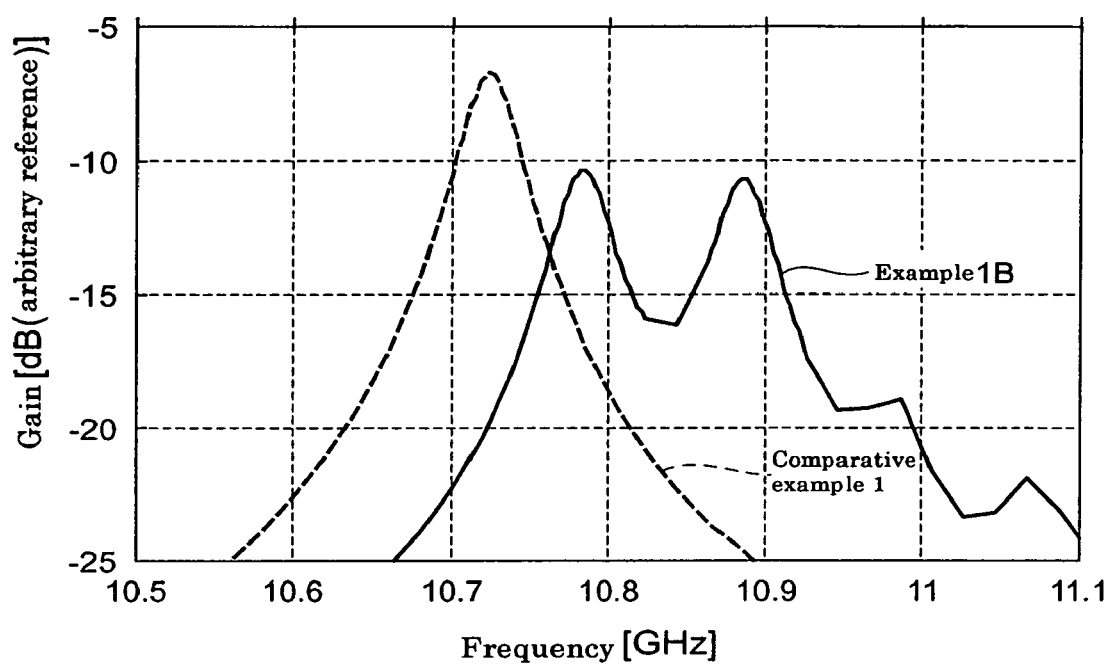
FIG. 9 is a graph showing the Brillouin gain spectrum of the optical fiber of Example 1B.

FIG. 9 is a graph showing the Brillouin gain spectrum of the optical fiber of Example 1B. The calculated results shown in Table IV and FIG. 9 are obtained by solving Eq. (9) using the full-vector finite element method to evaluate the overlapping between the optical mode and acoustic mode by using Eq. (12). The calculated results show the values at a wavelength of 1,550 nm.

Figure 10A:
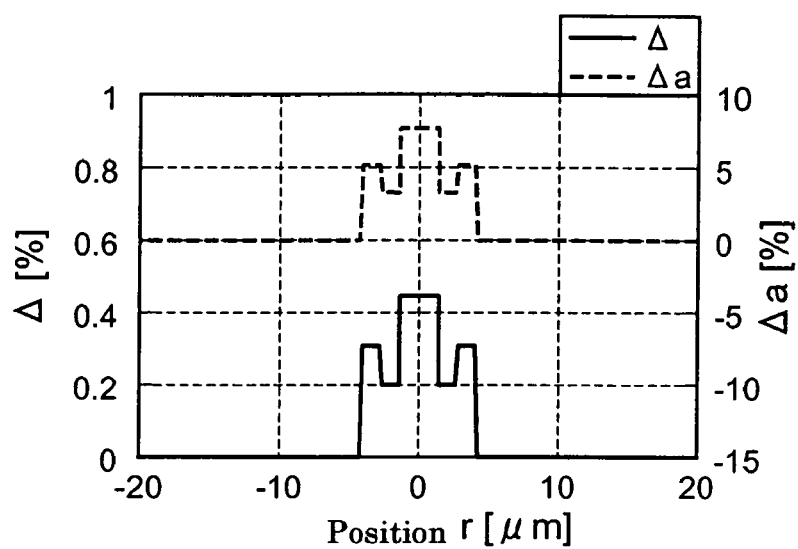
Figure 10B:
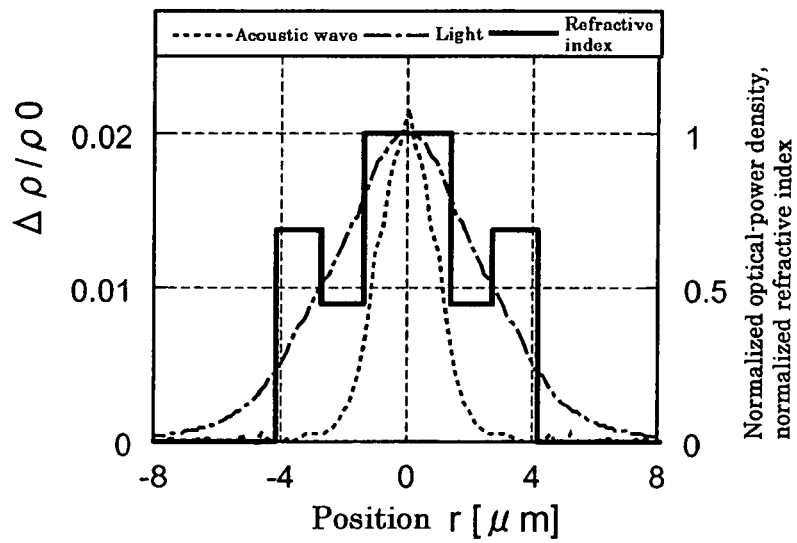
Figure 10C:
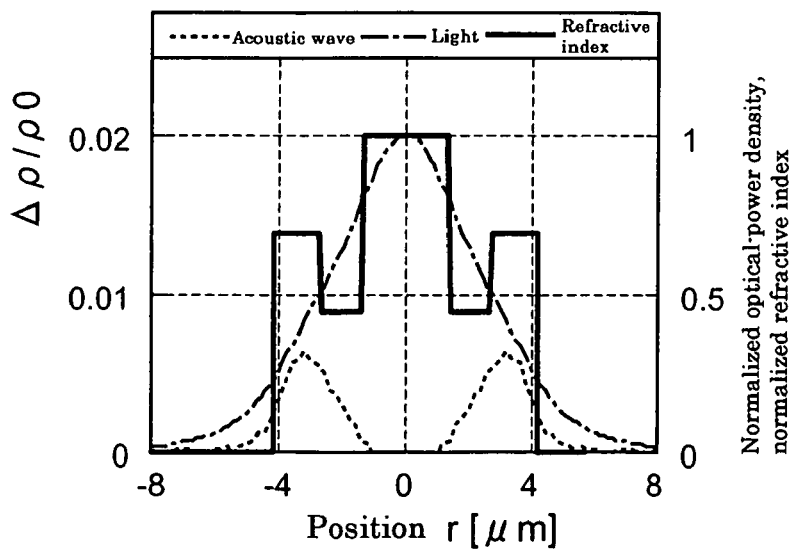

FIGS. 10A to 10C are graphs for explaining the acoustic mode in the optical fiber of Example 1B. FIG. 10A shows radial distributions of the relative refractive-index difference Δ and the relative acoustic refractive-index difference $\Delta_a$. FIGS. 10B and 10C show radial distributions of the acoustic-wave mode amplitude, normalized optical-power density, and normalized refractive index. FIGS. 10B and 10C show the radial distributions for two acoustic modes different from each other.

The optical fiber of Example 1B has an optical core region 10 in which the second region 12 has a relative acoustic refractive-index difference, $\Delta_a$, smaller than that of the first region 11 and the third region 13, between which the second region 12 is positioned. This condition concurrently produces an acoustic-wave mode that has a frequency of 10.784 GHz and that is localized in the first core region 11 as shown in FIG. 10B and another acoustic-wave mode that has a frequency of 10.887 GHz and that is localized in the third core region 13 as shown in FIG. 10C. Each acoustic-wave mode has a frequency different from each other, and the overlapping between each acoustic-wave mode and the optical mode is smaller than that in the case of Comparative example 1. The overlapping between the acoustic-wave mode having a frequency of 10.784 GHz and the optical mode is 0.0024, and the overlapping between the acoustic-wave mode having a frequency of 10.887 GHz and the optical mode is 0.0024. As a result, at the frequency of each acoustic-wave mode, a Brillouin gain smaller than that in Comparative example 1 is produced. In addition, because of the difference of 103 MHz in the frequency at which the Brillouin gain is produced, Example 1B, in the end, broadens the width of and decreases the height of the peak in the Brillouin gain spectrum in comparison with Comparative example 1.

As with the optical fiber of Example 1A, in the optical fiber of Example 1B, as a result of the existence of the acoustic mode localized in the third core region 13, which is the ring-shaped acoustic core, the peak of the gain spectrum is broadened, the peak gain is decreased, and the SBS threshold value is increased. In the optical fiber of Example 1B, the shape of the third core region 13, which is the acoustic core region, is much optimized. As a result, the Brillouin gain spectrum has two peaks having nearly the same height, and the SBS threshold value increases in comparison with the optical fiber of Example 1A and becomes 10.29 dBm, showing an increment of 3.56 dB from the value of the optical fiber of Comparative example 1. The 3-dB width of the Brillouin gain spectrum is 81 MHz, which is about 2 times the value before the broadening in the case of the optical fiber of Comparative example 1. This is because the number of peaks in the Brillouin gain spectrum is increased to two from one.

The optical fiber of Example 1B has a step-shaped refractive-index distribution. However, the actually produced optical fiber is not necessarily required to have the sharp step-shaped refractive-index distribution as shown here. As an example, the structure and property of the optical fiber of Example 1C are shown below. Although the optical fiber of Example 1C has a structure shown in FIGS. 1A to 1C, the composition in each region is not spatially uniform.

In the optical fiber of Example 1C, when the outer radii of the first region 11, the second region 12, and the third region 13 are denoted as R[1], R[2], and R[3], respectively, the ratio of the diameter of the first region 11 to that of the second region 12, i.e., R[1]/R[2], is 0.56 and the ratio of the diameter of the second region 12 to that of the third region 13, i.e., R[2]/R[3], is 0.61 and the third region 13 has a diameter, 2R[3], of 10.00 μm. Other features are shown in Table V.

TABLE V

| | $GeO_2$ concentration X[k] mol % | Relative refractive-index difference Δ[k] % | Longitudinal-mode acoustic velocity V[k] m/s |
|---|---|---|---|
| First region | 5.04 | 0.52 | 5721 |
| Second region | 1.25 | 0.13 | 5888 |
| Third region | 4.36 | 0.45 | 5751 |
| Optical cladding region | 0 | 0 | 5944 |

The ν value obtained by using Eq. (22) becomes 0.8. In this case, $\lambda_a$ is assumed to be 0.537 μm.

Table VI summarizes the following features of the optical fiber of Example 1C: the effective core area Aeff, the Brillouin gain-peak frequency, the SBS peak gain, and the SBS threshold value (converted into a value at an infinite length).

TABLE VI

| | Example 1C |
|---|---|
| Effective core area Aeff μm² | 88.4 |
| Peak gain frequency GHz | 10.736 |
| Peak gain dB | −10.23 |
| SBS threshold value dBm | 10.23 |

Figure 11:
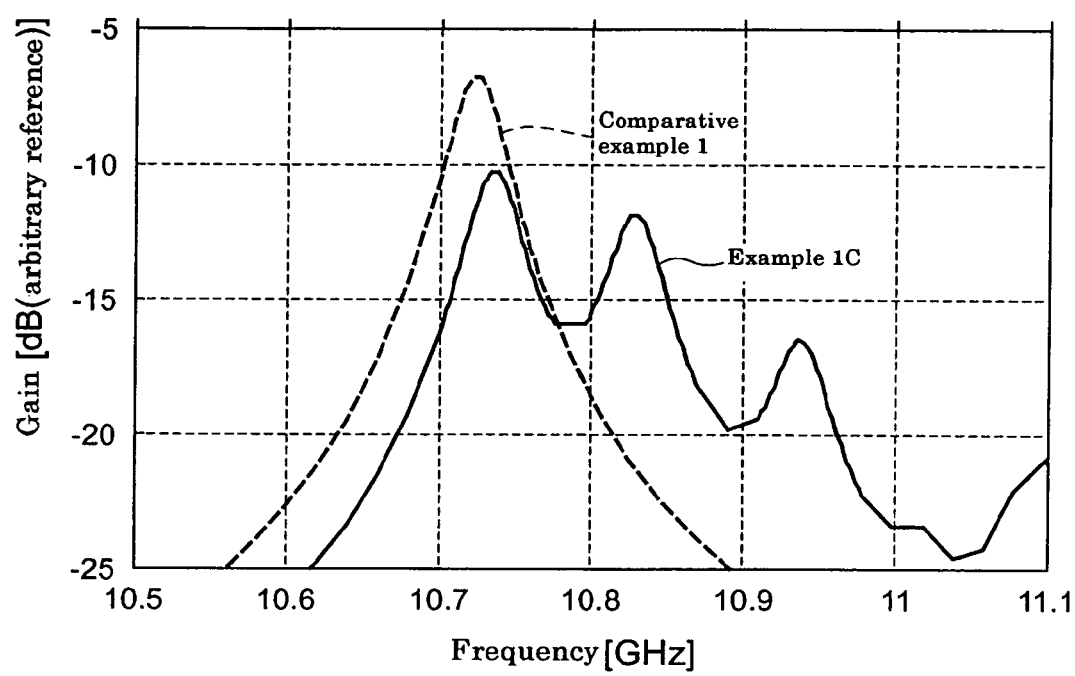
FIG. 11 is a graph showing the Brillouin gain spectrum of the fiber of Example 1C.

FIG. 11 is a graph showing the Brillouin gain spectrum of the optical fiber of Example 1C. The calculated results shown in Table VI and FIG. 11 are obtained by solving Eq. (9) using the full-vector finite element method to evaluate the overlapping between the optical mode and acoustic mode by using Eq. (12). The calculated results show the values at a wavelength of 1,550 nm.

Figure 12A:
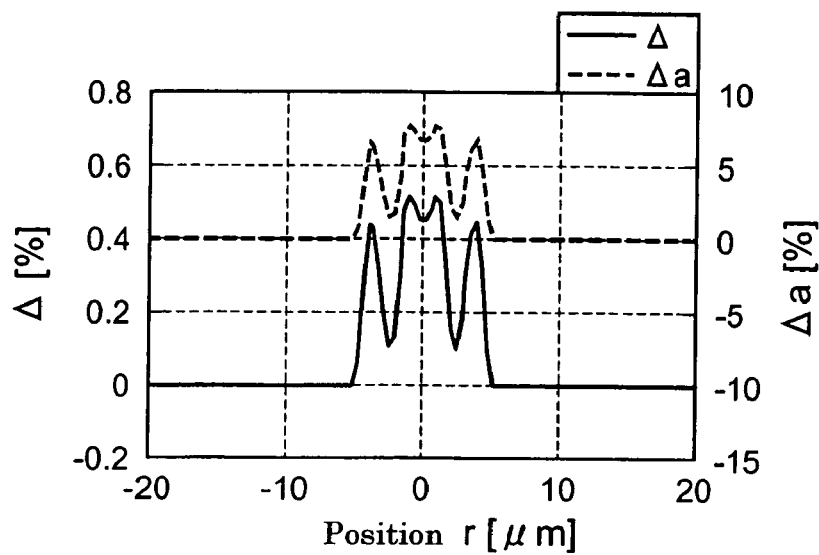
Figure 12B:
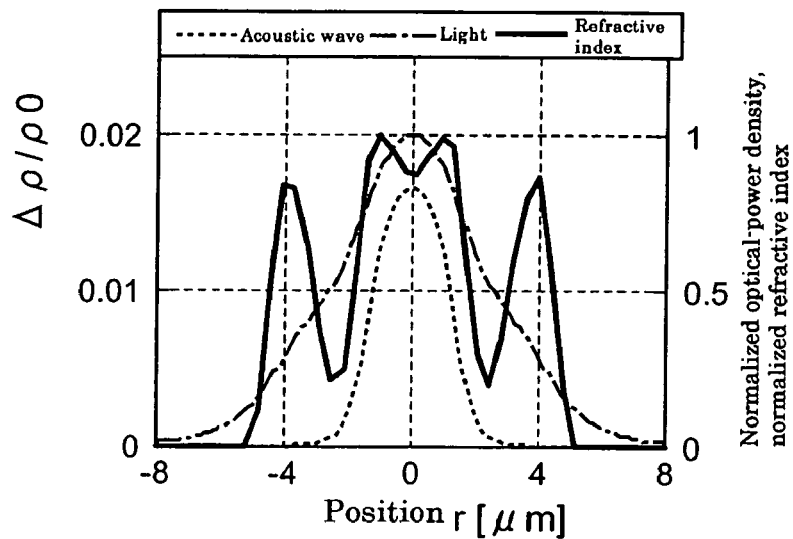
Figure 12C:
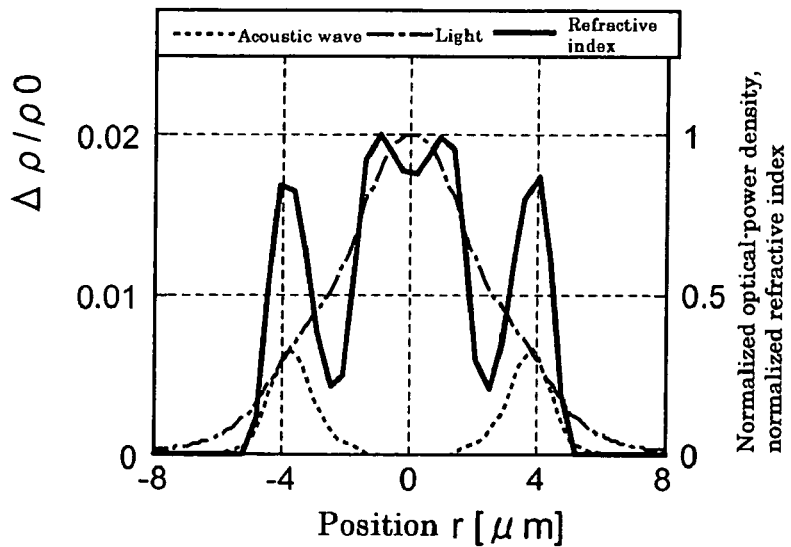

FIGS. 12A to 12C are graphs for explaining the acoustic mode in the optical fiber of Example 1C. FIG. 12A shows radial distributions of the relative refractive-index difference Δ and the relative acoustic refractive-index difference $\Delta_a$. FIGS. 12B and 12C show radial distributions of the acoustic-wave mode amplitude, normalized optical-power density, and normalized refractive index. FIGS. 12B and 12C show the radial distributions for two acoustic modes different from each other.

The optical fiber of Example 1C has an optical core region 10 in which the second region 12 has a relative acoustic refractive-index difference, $\Delta_a$, smaller than that of the first region 11 and the third region 13, between which the second region 12 is positioned. This condition concurrently produces an acoustic-wave mode that has a frequency of 10.735 GHz and that is localized in the first core region 11 as shown in FIG. 12B and another acoustic-wave mode that has a frequency of 10.829 GHz and that is localized in the third core region 13 as shown in FIG. 12C. Each acoustic-wave mode has a frequency different from each other, and the overlapping between each acoustic-wave mode and the optical mode is smaller than that in the case of Comparative example 1. The overlapping between the acoustic-wave mode having a frequency of 10.735 GHz and the optical mode is 0.0025, and the overlapping between the acoustic-wave mode having a frequency of 10.829 GHz and the optical mode is 0.002. As a result, at the frequency of each acoustic-wave mode, a Brillouin gain smaller than that in Comparative example 1 is produced. In addition, because of the difference of 94 MHz in the frequency at which the Brillouin gain is produced, Example 1C, in the end, broadens the width of and decreases the height of the peak in the Brillouin gain spectrum in comparison with Comparative example 1.

As with the optical fiber of Example 1A, in the optical fiber of Example 1C, as a result of the existence of the acoustic-wave mode localized in the third core region 13, which is the ring-shaped acoustic core, the peak of the gain spectrum is broadened, the peak gain is decreased, and the SBS threshold value is increased. In the optical fiber of Example 1C, the shape of the third core region 13, which is the acoustic core region, is much optimized. As a result, the Brillouin gain spectrum has two peaks, and the SBS threshold value increases in comparison with the optical fiber of Example 1A and becomes 10.23 dBm, showing an increment of 3.50 dB from the value of the optical fiber of Comparative example 1. The 3-dB width of the Brillouin gain spectrum is 68 MHz, which is about 1.7 times the value before the broadening in the case of the optical fiber of Comparative example 1.

Other optical properties of the optical fiber of Example 1C are as follows: (a) the mode-field diameter at a wavelength of 1,310 nm is 9.34 μm, (b) the cable cutoff wavelength is 1.13 μm, (c) the 32-mm-diameter bending loss at a wavelength of 1,550 nm is 0.73 dB/m, and (d) the zero dispersion wavelength is 1.319 μm. These properties can fulfill the specifications of the ITU-T G.652D. Therefore, the optical fiber of Example 1C can increase the SBS threshold value to transmit an increased amount of optical power while maintaining the compatibility with the G.652 fiber, which is widely used at the present.

Second Embodiment

Figure 13A:
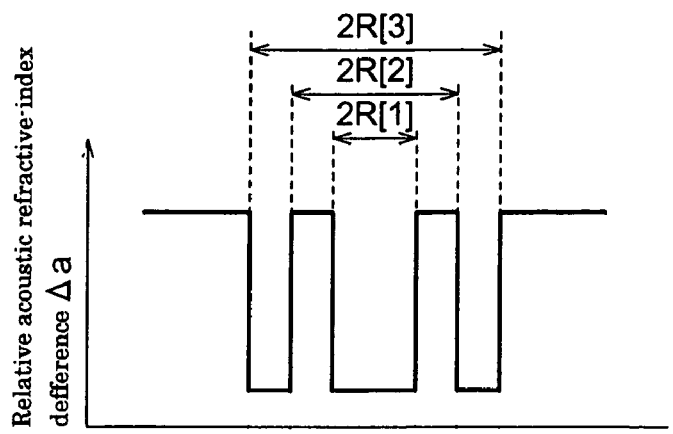
Figure 13B:
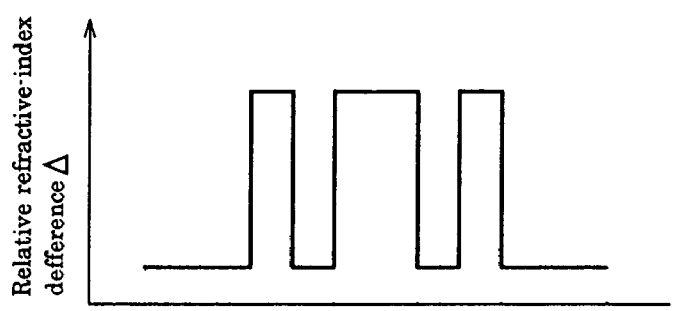
Figure 13C:
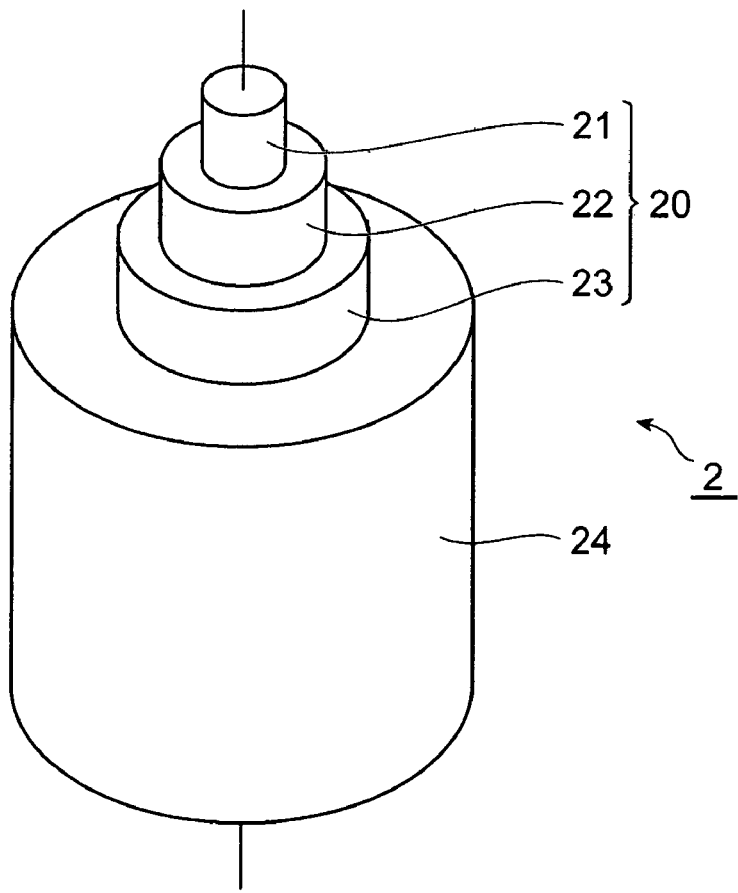

FIGS. 13A to 13C are graphs and a diagram for explaining an optical fiber 2 of a second embodiment. FIG. 13A is a graph showing a radial distribution of the relative acoustic refractive-index difference $\Delta_a$, FIG. 13B is a graph showing a radial distribution of the relative refractive-index difference $\Delta$, and FIG. 13C is a conceptual diagram showing the structure of the optical fiber 2. The optical fiber 2 comprises an optical core region 20 including the center axis indicated by alternate long and short dashed lines in FIG. 13C and an optical cladding region 24 surrounding the optical core region 20. The optical core region 20 is composed of a first region 21, a second region 22, and a third region 23 in this order from the inside. The individual regions are placed coaxially around the center axis and stretch along the center axis (FIG. 13C).

The average refractive index of the optical core region 20 is higher than the refractive index of the optical cladding region 24. Therefore, the optical fiber 2 can localize the propagation mode of light in the optical core region 20 to enable the light to be guided. In the second embodiment, the second region 22, which is a part of the optical core region 20, is a ring-shaped acoustic core region. The propagation mode of the acoustic wave can be localized in the second region 22.

The refractive index of the first region 21 is denoted as n[1], that of the second region 22 as n[2], that of the third region 23 as n[3], and that of the optical cladding region 24 as n[4]. The relative refractive-index difference of the first region 21 is denoted as $\Delta[1]$, that of the second region 22 as $\Delta[2]$, that of the third region 23 of $\Delta[3]$, and that of the optical cladding region 24 as $\Delta[4]$. The relative refractive-index difference $\Delta[k]$ of the individual regions is expressed as Eq. (16) using the refractive index n[k] of the individual regions and the refractive index no of pure silica glass. In this case, the relationship in the magnitude of refractive index between the individual regions and the relationship in the magnitude of relative refractive-index difference between the individual regions are expressed as Formula (17) (FIG. 13B).

The longitudinal-mode acoustic velocity in the first region 21 is denoted as V[1], that in the second region 22 as V[2], that in the third region 23 as V[3], and that in the optical cladding region 24 as V[4]. The relative acoustic refractive-index difference of the first region 21 is denoted as $\Delta_a[1]$, that of the second region 22 as $\Delta_a[2]$, that of the third region 23 as $\Delta_a[3]$, and that of the optical cladding region 24 as $\Delta_a[4]$. The relative acoustic refractive-index difference $\Delta_a[k]$ of the individual regions is expressed as Eq. (18) using the longitudinal-mode acoustic velocity V[k] in the individual regions and the longitudinal-mode acoustic velocity $V_0$ in pure silica glass. In this case, the relationship in the magnitude of longitudinal-mode acoustic velocity between the individual regions and the relationship in the magnitude of relative acoustic refractive-index difference between the individual regions are shown by Formula (23) (FIG. 13A).

$$V[1] > V[2] < V[3] > V[4] \quad (23a).$$

$$\Delta_a[1] < \Delta_a[2] > \Delta_a[3] < \Delta_a[4] \quad (23b).$$

The refractive index and longitudinal-mode acoustic velocity in the individual regions are not required to be strictly uniform. When not uniform, an average value weighted by the volume in that region can be used.

As described above, the longitudinal-mode acoustic velocity V[2] in the second region 22 (acoustic core region) is lower than the longitudinal-mode acoustic velocity V[1] in the first region 21, which is positioned directly inside the second region 22, and is lower than the longitudinal-mode acoustic velocity V[3] in the third core region 23, which is positioned directly outside the second region 22. The longitudinal-mode acoustic velocity in the second region 22 and the radial thickness of the second region 22 are predetermined so that a longitudinal-mode acoustic wave that is localized in the second region 22 and that propagates along the center axis can exist.

It is desirable that each of the first region 21, the second region 22, the third region 23, and the optical cladding region 24 be made of pure silica glass or silica glass doped with the element F. When the F concentration in the first region 21 is denoted as Y[1], that in the second region 22 as Y[2], that in the third region 23 as Y[3], and that in the optical cladding region 24 as Y[4], the parameters have the relationship expressed by Formula (24).

$$Y[1] < Y[2] > Y[3] < Y[4] \quad (24).$$

In this case, also, the production of the optical fiber is particularly easy.

Next, an optical fiber of Example 2, which is a concrete example for the optical fiber 2 of the second embodiment, is explained below together with an optical fiber of Comparative example 2. In the optical fiber of Example 2, when the outer radii of the first region 21, the second region 22, and the third region 23 are denoted as R[1], R[2], and R[3], respectively, the ratio of the diameter of the first region 21 to that of the second region 22, i.e., R[1]/R[2], is 0.33 and the ratio of the diameter of the second region 22 to that of the third region 23, i.e., R[2]/R[3], is 0.60 and the third region 23 has a diameter, 2R[3], of 11.47 µm. Other features are shown in Table VII.

TABLE VII

| | $F_2$ concentration Y[k] wt. % | Relative refractive-index difference $\Delta$[k] % | Longitudinal-mode acoustic velocity V[k] m/s |
|---|---|---|---|
| First region | 0 | 0 | 5944 |
| Second region | 1.367 | −0.5 | 5701 |
| Third region | 0 | 0 | 5944 |
| Optical cladding region | 1.367 | −0.5 | 5701 |

The acoustic core's v value defined by Eq. (22) is 1.22. In this case, $\lambda_a$ is assumed to be 0.537 µm.

On the other hand, the optical fiber of Comparative example 2 has a step-index-type refractive-index profile. In this optical fiber, each of the core region and the cladding region is made of silica glass doped with the element F. The core region has a relative refractive-index difference of −0.24% and the cladding region has a relative refractive-index difference of −0.5%. The core region has a diameter of 14.16 µm. The relative refractive-index difference in the core region is assumed to be uniform.

Table VIII summarizes the following features of the optical fibers of Example 2 and Comparative example 2: the effective core area Aeff, the Brillouin gain-peak frequency, the SBS peak gain, and the SBS threshold value (converted into a value at an infinite length).

TABLE VIII

| | Example 2 | Comparative example 2 |
|---|---|---|
| Effective core area Aeff µm² | 127.4 | 122.7 |
| Peak gain frequency GHz | 10.682 | 10.864 |
| Peak gain dB | −12.39 | −8.95 |
| SBS threshold value dBm | 12.39 | 8.95 |

Figure 14:
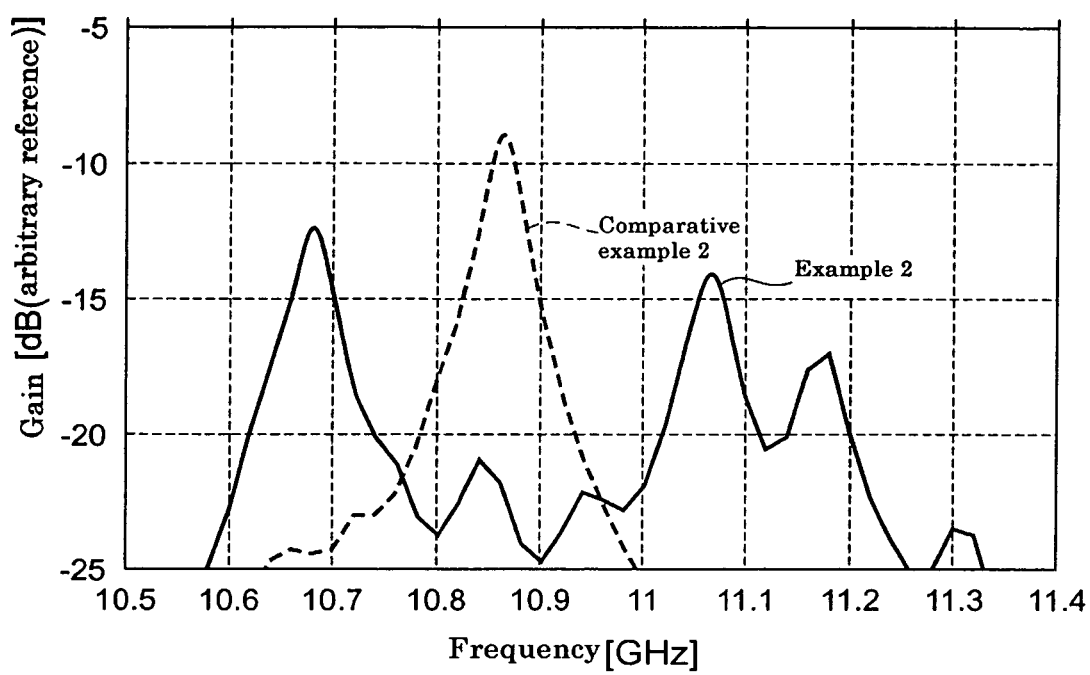
FIG. 14 is a graph showing the Brillouin gain spectra of the optical fibers of Example 2 and Comparative example 2.

FIG. 14 is a graph showing the Brillouin gain spectra of the optical fibers of Example 2 and Comparative example 2. The calculated results shown in Table VIII and FIG. 14 are obtained by solving Eq. (9) using the full-vector finite element method to evaluate the overlapping between the optical mode and acoustic mode by using Eq. (12). The calculated results show the values at a wavelength of 1,550 nm.

The effective core areas of the optical fibers of Example 2 and Comparative example 2 are about 125 µm² and are nearly equal to each other. Consequently, the optical-power density distributions in both optical fibers are nearly the same. In the Brillouin gain spectrum, however, the optical fiber of Example 2 is different from the optical fiber of Comparative example 2.

The reason is explained as follows. In the optical fiber of Comparative example 2, the acoustic mode exists spreading over the entire optical core region 20, and the overlapping between the acoustic mode and the optical mode is large. As a result, a high Brillouin gain peak is produced at a frequency of 10.864 GHz in the acoustic mode. On the other hand, in the optical fiber of Example 2, the acoustic mode exists localized in the second core region 22, which is the ring-shaped acoustic core region, and the overlapping between the acoustic mode and the optical mode is small. As a result, a comparatively low Brillouin gain peak is produced at a frequency of 10.681 GHz in the acoustic mode. In addition, in the optical fiber of Example 2, a weakly localized acoustic mode having a frequency of 11.064 GHZ, also, exists in the first core region 21, and the overlapping between this acoustic mode and the optical mode is also small. As a result, a low Brillouin gain peak is produced at a frequency of 11.064 GHz. Such a difference in Brillouin gain can be explained by the difference in the behavior of the acoustic modes in the individual fibers as shown in FIGS. 15A and 15B and FIGS. 16A to 16C.

Figure 15A:
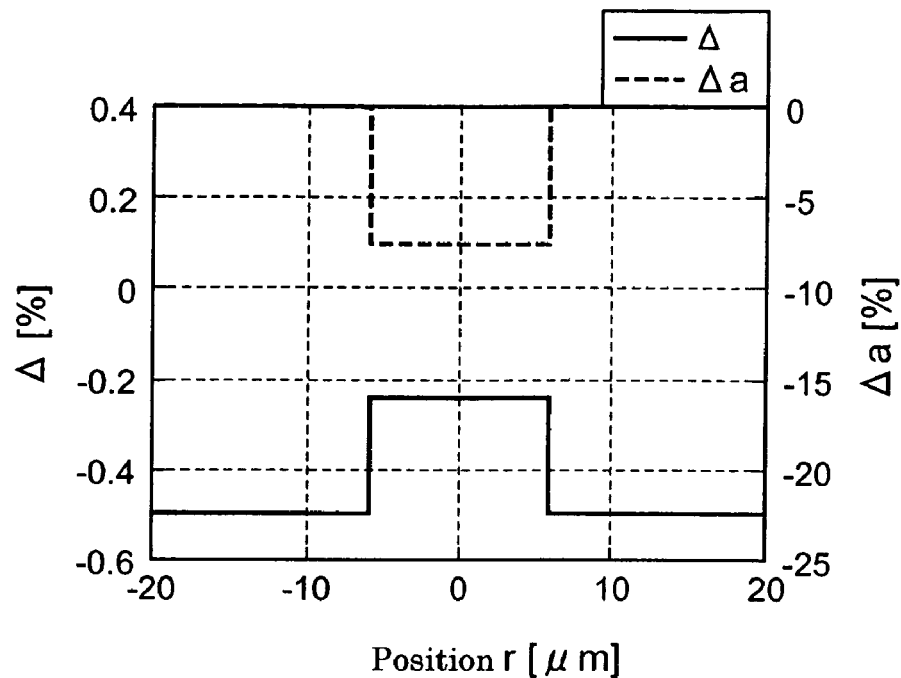
Figure 15B:
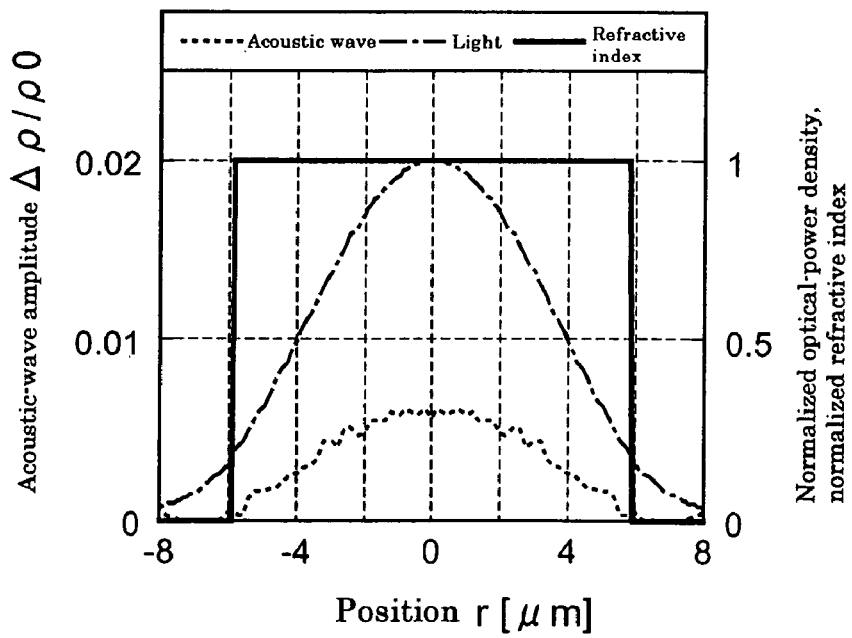
Figure 16A:
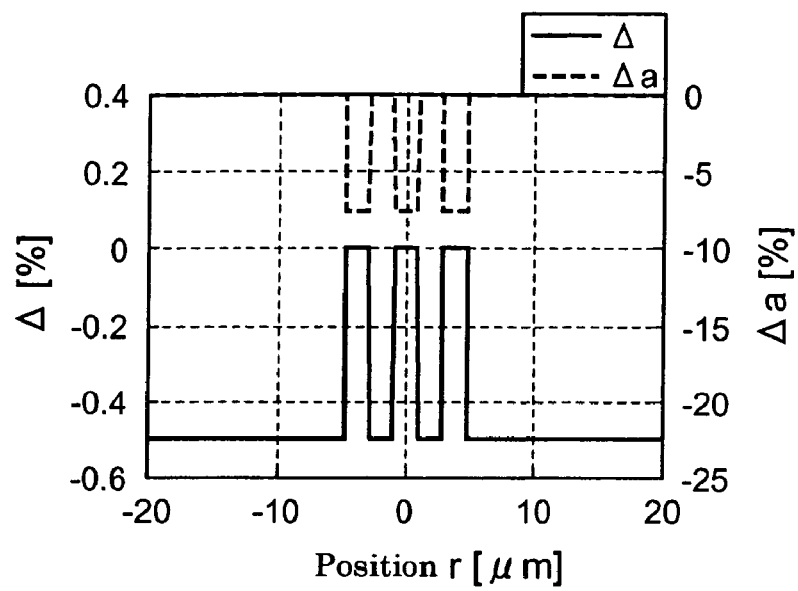
Figure 16B:
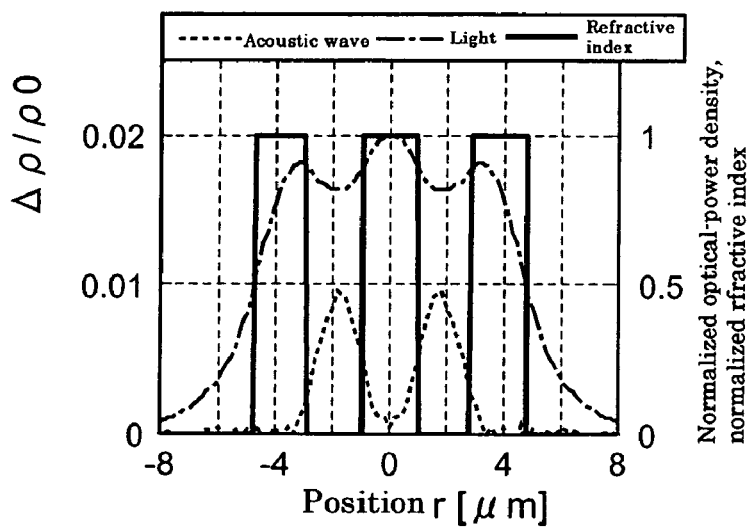
Figure 16C:
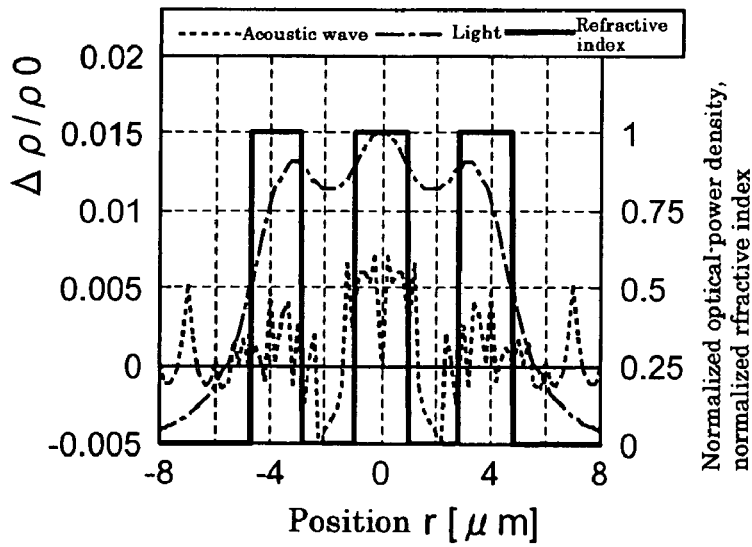

FIGS. 15A and 15B are graphs for explaining the acoustic mode in the optical fiber of Comparative example 2. FIG. 15A shows radial distributions of the relative refractive-index difference $\Delta$ and the relative acoustic refractive-index difference $\Delta_a$. FIG. 15B shows radial distributions of the acoustic-wave mode amplitude, normalized optical-power density, and normalized refractive index. FIGS. 16A to 16C are graphs for explaining the acoustic mode in the optical fiber of Example 2. FIG. 16A shows radial distributions of the relative refractive-index difference $\Delta$ and the relative acoustic refractive-index difference $\Delta_a$. FIGS. 16B and 16C show radial distributions of the acoustic-wave mode amplitude, normalized optical-power density, and normalized refractive index. FIGS. 16B and 16C show the radial distributions for two acoustic modes different from each other.

In FIG. 15B and FIGS. 16B and 16C, the amplitude of the acoustic-wave mode is $\Delta\rho/\rho_0$ given by Eq. (13). The normalization of the optical-power density and refractive index is performed by the conversion using a linear function such that the minimum value becomes 0 and the maximum value becomes 1.

As can be seen from FIG. 15B, in the optical fiber of Comparative example 2, the optical mode and the acoustic-wave mode each have a radial distribution having a shape similar to each other, and therefore the overlapping is as large as 0.0029. As a result, the gain due to SBS becomes large and the gain spectrum has a high peak at a frequency of 10.864 GHz of the acoustic wave.

On the other hand, as can be seen from FIGS. 16A to 16C, the optical fiber of Example 2 has the second core region 22 as the ring-shaped acoustic core region, and therefore a localized acoustic wave exists in the acoustic core region. The overlapping between this acoustic wave and the light becomes 0.0019, which is smaller than that in the optical fiber of Comparative example 2. As a result, in the optical fiber of Example 2, at a frequency of 10.681 GHz of the acoustic-wave mode, a gain smaller than that in the optical fiber of Comparative example 2 is produced. In the end, the height of the peak in the Brillouin gain spectrum is decreased, and the SBS threshold value is increased. In other words, the optical fiber of Example 2 can transmit, without producing SBS, an optical power higher than the optical fiber of Comparative example 2 can. In addition, in the optical fiber of Example 2, an acoustic wave weakly localized in the first core region 21 exists at a frequency of 11.064 GHZ. The overlapping between this acoustic wave and the light is as small as 0.001, so that a low Brillouin gain peak is produced at a frequency of 11.064 GHz. As described above, in the optical fiber of Example 2, also, it is desirable that a localized acoustic-wave mode exist in each of the first core region 21 and the second core region 22, which are located at positions different from each other. When this condition is satisfied, the overlapping between each acoustic mode and the light is decreased, so that the Brillouin gain is reduced and the SBS threshold value is increased. In addition, whereas the 3-dB width in the optical fiber of Comparative example 2 is 40 MHz, the 3-dB width in the optical fiber of Example 2 is 76 MHz. This shows that the peak width in the Brillouin gain spectrum of the optical fiber of Example 2 is broadened.

The present invention is described above in connection with what is presently considered to be the most practical and preferred embodiments. However, the invention is not limited to the disclosed embodiments, but, on the contrary, is intended to cover various modifications and equivalent arrangements included within the spirit and scope of the appended claims.

The entire disclosure of Japanese patent application 2004-377800 filed on Dec. 27, 2004 including the specification, claims, drawing, and summary is incorporated herein by reference in its entirety.

What is claimed is:

1. An optical fiber comprising:
   (a) an optical core region that includes the center axis;
   (b) an optical cladding region that has a refractive index lower than that of the optical core region and that surrounds the optical core region; and
   (c) a ring-shaped acoustic core region as a part of the optical core region,
   each of the optical core region, the acoustic core region, and the optical cladding region being placed coaxially around the center axis and stretching along the center axis; a longitudinal-mode acoustic velocity in the acoustic core region being lower than that in the region positioned directly inside the acoustic core region and being lower than that in the region positioned directly outside the acoustic core region; the longitudinal-mode acoustic velocity in the acoustic core region and the radial thickness of the acoustic core region being predetermined so that a longitudinal mode acoustic wave that is localized in the acoustic core region and that propagates along the center axis can exist; and the optical fiber having a Brillouin gain spectrum whose 3-dB width is at least 60 MHz, and
   the optical fiber satisfying the relationship of $$\frac{t}{\lambda_a}\left\{1-\left(\frac{V_1}{V_0}\right)^2\right\}^{\frac{1}{2}} > 0.35, \tag{1}$$

where: $V_0$ is a longitudinal-mode acoustic velocity that is the slower one in the group consisting of a longitudinal-mode acoustic velocity in the region directly inside the acoustic core region and a longitudinal-mode acoustic velocity in the region directly outside the acoustic core region; $V_1$ is a longitudinal-mode acoustic velocity in the acoustic core region; t is a radial thickness of the acoustic core region; and $\lambda_a$ is a wavelength of an acoustic wave and has a value of 0.537 μm.

2. An optical fiber as defined by claim 1, wherein:
(a) the optical core region is composed of a first region, a second region, and a third region in this order from the inside; (b) the third region is the acoustic core region; (c) each of the first region, the second region, the third region, and the optical cladding region is made of a material selected from the group consisting of pure silica glass and silica glass doped with $GeO_2$; and (d) when the $GeO_2$ concentration in the first region is denoted as X[1], the $GeO_2$ concentration in the second region as X[2], the $GeO_2$ concentration in the third region as X[3], and the $GeO_2$ concentration in the optical cladding region as X[4], the parameters have the relationship expressed by the formula of $$X[1]>X[2]<X[3]>X[4] \qquad (2).$$

3. An optical fiber as defined by claim 2, wherein:
(a) a longitudinal-mode acoustic velocity in the first region is different from that in the third region; (b) a localized acoustic-wave mode exists in the first region and another localized acoustic-wave mode exists in the third region; and (c) a frequency difference of at least 50 MHz exists between the two acoustic-wave modes.

4. An optical fiber as defined by claim 2, the optical fiber having:
(a) a mode-field diameter at a wavelength of 1,310 nm lying in the range of 8 to 10 μm;
(b) a cable cutoff wavelength of at most 1,260 nm;
(c) a zero dispersion wavelength lying in the range of 1,300 to 1,324 nm;
(d) a bending loss of at most 4 dB/m at a wavelength of 1,550 nm when the fiber is bent with a diameter of 32 mm;
(e) a loss of at most 0.25 dB/km at a wavelength of 1,550 nm; and
(f) an SBS threshold value of at least 9 dBm at a wavelength of 1,550 nm when the threshold value is converted into a value at an infinite length.

5. An optical fiber as defined by claim 1, wherein:
(a) the optical core region is composed of a first region, a second region, and a third region in this order from the inside; (b) the second region is the acoustic core region; (c) each of the first region, the second region, the third region, and the optical cladding region is made of a material selected from the group consisting of pure silica glass and silica glass doped with the element F; and (d) when the concentration of the element F in the first region is denoted as Y[1], the concentration of the element F in the second region as Y[2], the concentration of the element F in the third region as Y[3], and the concentration of the element F in the optical cladding region as Y[4], the parameters have the relationship expressed by the formula of $$Y[1]<Y[2]>Y[3]<Y[4] \qquad (3).$$

* * * * *